(12) United States Patent
Maytal

(10) Patent No.: US 6,457,037 B1
(45) Date of Patent: *Sep. 24, 2002

(54) METHOD AND SYSTEM FOR CONTROLLING THE CPU CONSUMPTION OF SOFT MODEMS

(75) Inventor: Benjamin Maytal, Mevasseret Zion (IL)

(73) Assignee: Smart Link Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 08/929,882

(22) Filed: Sep. 15, 1997

Related U.S. Application Data

(63) Continuation-in-part of application No. 08/775,385, filed on Dec. 30, 1996.

(51) Int. Cl.[7] ................................. G06F 9/00
(52) U.S. Cl. ............ 709/100; 375/219; 375/220; 375/222; 709/236; 709/248
(58) Field of Search ................ 709/100, 101, 709/102, 103, 104, 107, 108, 236, 248; 375/219, 220, 222; 370/395.53, 395.52, 395.65

(56) References Cited

U.S. PATENT DOCUMENTS

| | | | |
|---|---|---|---|
| 3,842,405 A | * 10/1974 | Key et al. ............... | 709/236 |
| 4,355,310 A | * 10/1982 | Belaigues et al. ....... | 340/853.2 |
| 4,736,318 A | 4/1988 | Delyani et al. .......... | 364/200 |
| 5,291,694 A | 3/1994 | Baker et al. ............. | 395/800 |
| 5,339,413 A | 8/1994 | Koval et al. | |
| 5,392,448 A | 2/1995 | Frankel et al. .......... | 395/800 |
| 5,423,022 A | 6/1995 | Ackley | |
| 5,541,955 A | 7/1996 | Jackobsmeyer .......... | 375/222 |
| 5,628,013 A | 5/1997 | Anderson ................ | 395/677 |
| 5,721,922 A | 2/1998 | Dingwall ................ | 395/673 |
| 5,991,308 A | * 11/1999 | Fuhrmann et al. ..... | 370/395.53 |
| 6,044,107 A | * 3/2000 | Gatherer et al. ........ | 375/222 |

OTHER PUBLICATIONS

Core Technologies, "Pentium Secrets", Terje Mathisen, published in Byte Magazine, pp. 191–192, Jul. 1994.
"Intel Beats NSP Drum", Martin Gold, CMP Publications Inc. 1995.
The Theory and Practice of Modem Design, John A. C. Bingham, A Wiley—Interscience Publication, John Wiley & Sons.

* cited by examiner

Primary Examiner—Majid Bananlehah
(74) Attorney, Agent, or Firm—Eitan, Pearl, Latzer & Cohen-Zedek

(57) ABSTRACT

A manager for a personal computer for managing the operation of modem tasks while the personal computer also performs other tasks includes at least one driver and a task service manager. The driver activates and controls the modem tasks and the task service manager allocates time between the modem tasks and the other tasks, selects the service levels of the modem tasks in response to the activity levels of the other tasks and invokes the driver to activate and control the modem tasks at the selected service levels.

27 Claims, 17 Drawing Sheets

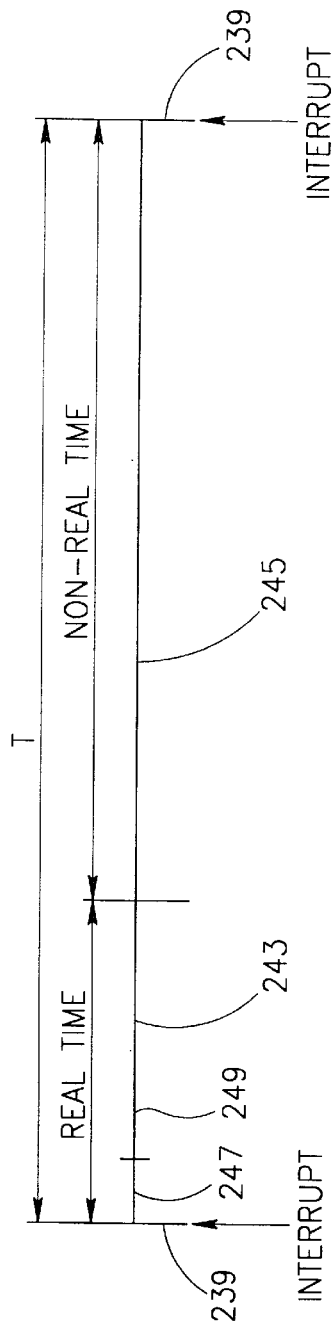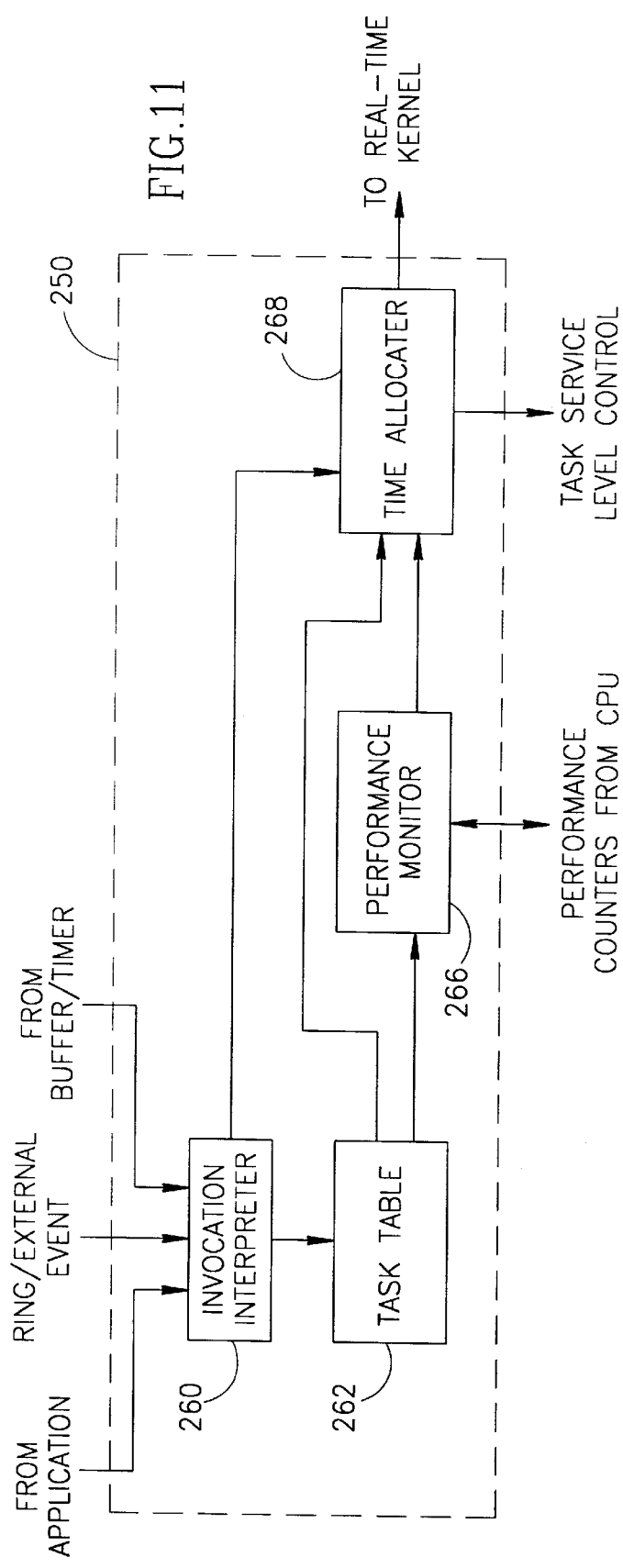

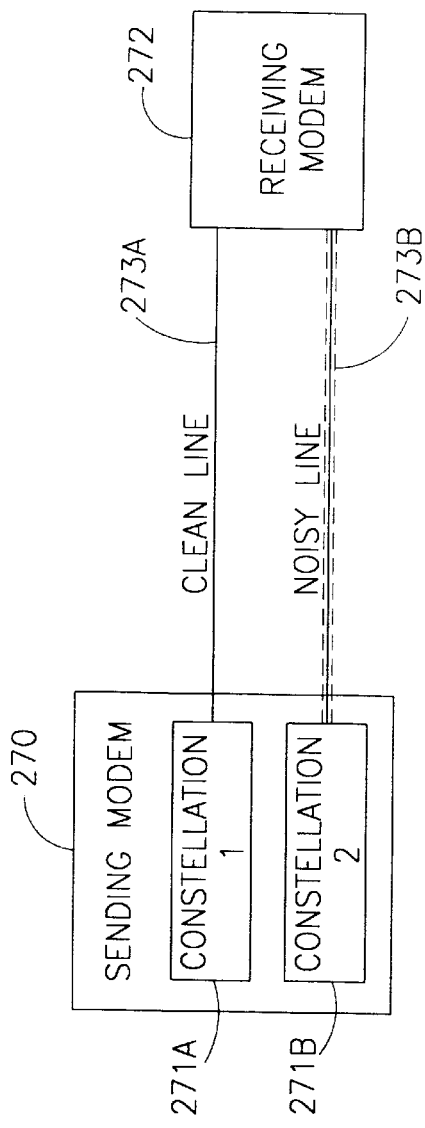
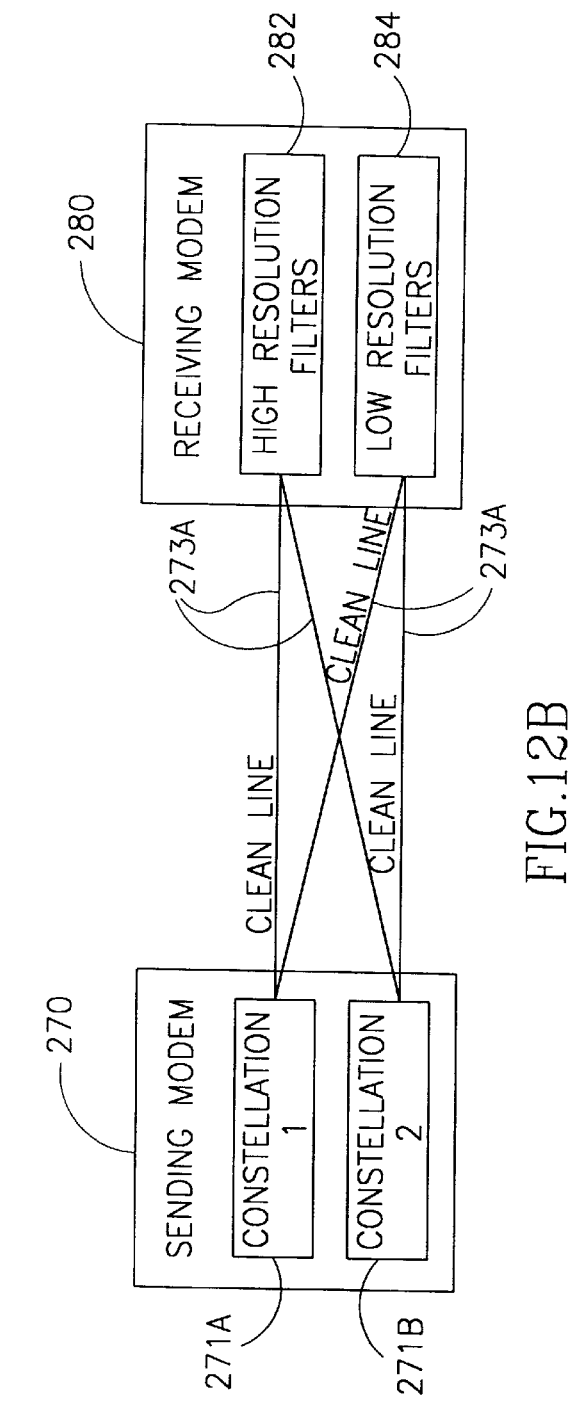

US 6,457,037 B1

METHOD AND SYSTEM FOR CONTROLLING THE CPU CONSUMPTION OF SOFT MODEMS

This application is a continuation-in-part of Ser. No. 08/775,385 filed Dec. 30, 1996.

FIELD OF THE INVENTION

The present invention relates to host signal processing modems generally and to multi-line modems in particular.

BACKGROUND OF THE INVENTION

Modems are utilized for transferring data between a personal computer (PC) and an external computer. The modem translates between characters of PC data and electrical signals which are carried on the phone lines and thus enables the PC to communicate with the external world.

A modem initiates a communication with a training session in which the two communicating modems synchronize their signals and decide on a communication format. After the training session, the application prepares packets of data to transmit and provides these to the modem. The modem, in turn, converts the packets into bits or symbols, modulates the bits, samples the signal and transmits the resultant signal. After converting the phone signal to digital samples, the receiving modem demodulates the samples to determine the data of the packet. After a packet is transmitted, the two modems have a "handshake" to ensure that the receiving modem properly received the packet. The demodulated packet is then provided to the receiving application.

A modem typically is a peripheral unit of the PC, whether located externally or internally to the box of the PC. The modem includes various interface elements which digitize the analog phone signals and a digital signal processor which performs the modulation and demodulation operations, as well as the training session and any handshake operations.

Recently, a new type of modem has appeared which performs most of the modem operations internally on the personal computer. This "native" or "host" signal processing modem includes an interface which digitizes the analog phone line data and an application on the PC which performs the modem operations. Various host signal processing modems are described in U.S. Ser. No. 08/775,385 and in U.S. Pat. No. 4,965,641 which are incorporated herein by reference.

Small to mid-sized offices which have multiple computers, some or all of whom might want to communicate with the external world, require multiple modems. Each computer can have its own individual modem or, if the computers are connected together via a local area network (LAN) 10 as shown in FIG. 1 to which reference is now made, the computers can communicate through a multi-line modem 12.

The multi-line modem 12 typically is connected to multiple external telephone lines 14 on one end and to the LAN 10 on the other. The computers of the office are also connected to the LAN 10, as "clients" 16, and there is a "server" 18 which controls the LAN 10. The multi-line modem 12 can either be an add-on card to the server 18 or a unit separate from it. The multi-line modem 12 connects the client 16 which currently wants to communicate to the line 14 currently available and performs the modem operations for each and every client currently communicating.

Such multi-line modems are also very common at web sites and Internet service providers which must provide multiple callers with access to their computers.

No multi-line modems have been produced with host signal processing because of the significant amount of processing power required to service even a single line.

BRIEF DESCRIPTION OF THE DRAWINGS

The present invention will be understood and appreciated more fully from the following detailed description taken in conjunction with the appended drawings in which:

FIG. 10 is a timing diagram of operations of the personal computer system of FIG. 9;

FIG. 11 is a block diagram illustration of elements of a task service manager forming part of the system of FIG. 9;

FIG. 12A is a block diagram of a prior art modem communication system;

FIG. 12B is a block diagram of a gracefully changing modem communication system forming part of the system of FIG. 9;

DETAILED DESCRIPTION OF THE PRESENT INVENTION

Figure 1:
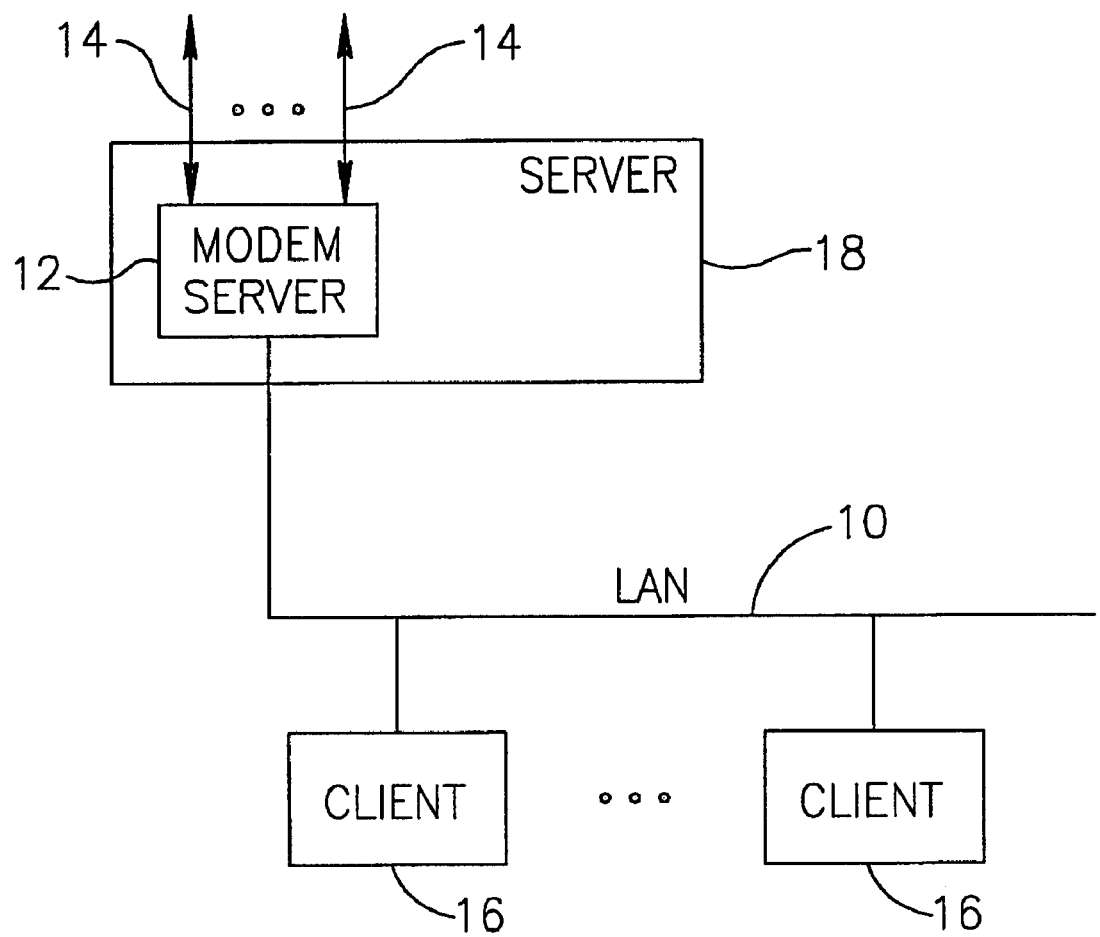
FIG. 1 is a schematic illustration of a local area network (LAN) with a prior art multi-line modem.
Figure 2:
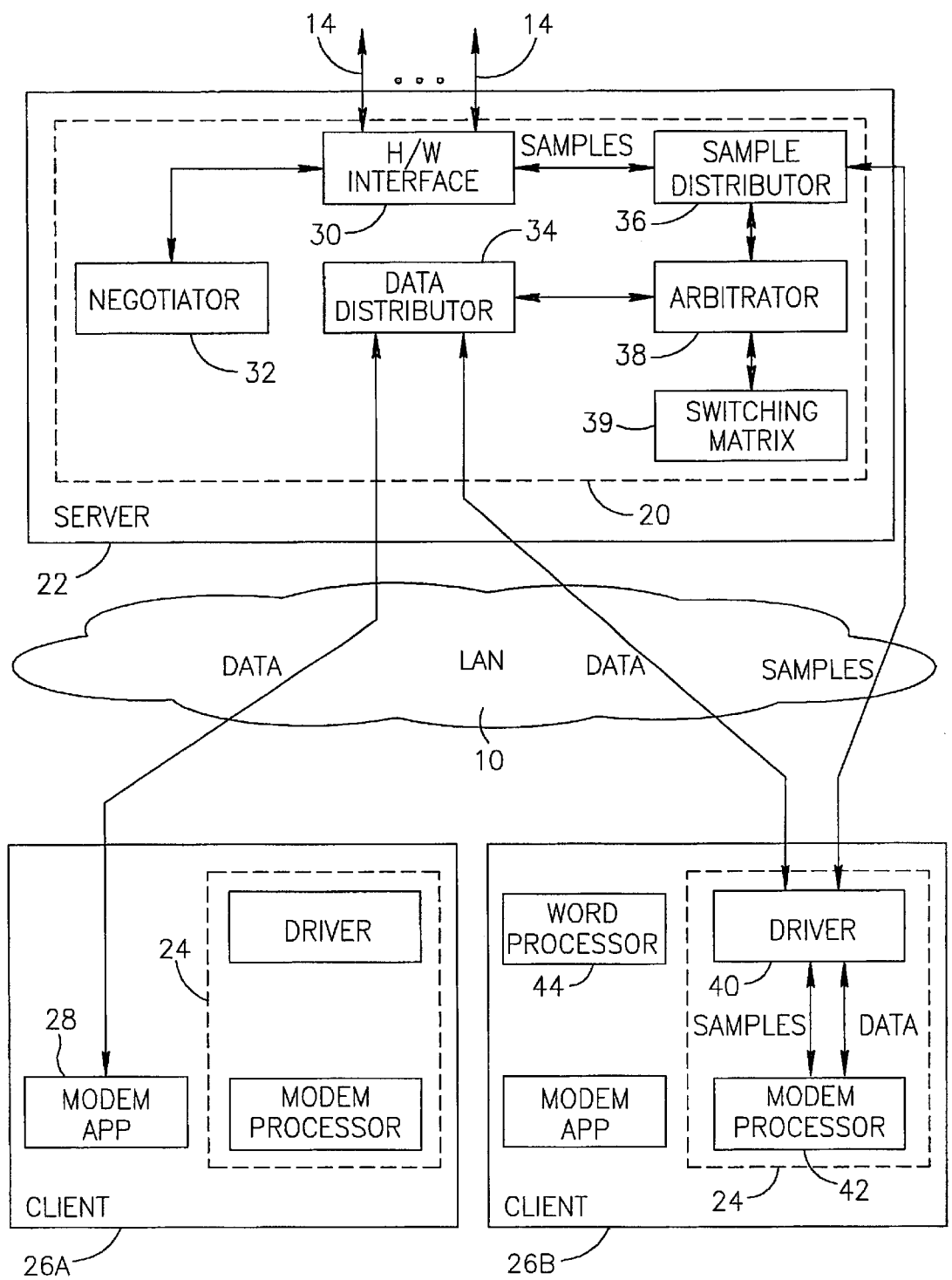
FIG. 2 is a schematic illustration of a multi-line, distributed modem, constructed and operative in accordance with a preferred embodiment of the present invention.

Reference is now made to FIG. 2 which illustrates a system for executing real-time tasks in a distributed manner over a network. In the example of FIG. 2, a multi-line distributed modem is shown. It will be appreciated that the principles of the present invention are applicable to real-time tasks other than modem processing, such as video compression and decompression and video conferencing.

The multi-line modem of the present invention is distributed among the computers connected to the LAN. In the first embodiment of FIG. 2, the control units 20 of the multi-line modem reside in the server 22 and multiple processing units 24 of the multi-line modem reside in the multiple clients 26.

Modem applications 28, such as a terminal emulator, a web browser, or an email program, are also found on the multiple clients 26. These applications 28 request or respond to a communication with the external world which the multi-line modem of the present invention must implement.

The control unit 20 of the distributed modem controls the connection to the external world and directs the operation of the processing units 24 while each of the latter perform the modulation or demodulation of the signal on one particular line. The control unit 20 responds to the external world (dialing another modem, answering an incoming call, handling the initial training phase, etc.) for each of the multiple phone lines 14 and only activates one of the processing units 24 once modulation or demodulation of signal of a line is required. The control unit 20 also communicates with the modem applications 28, receiving data to be modulated and providing demodulated data.

It is noted that the control unit 20 and processing units 24 are not the only processes operating on the server 22 and clients 26, respectively. However, elements 20 and 24 perform real-time processes and thus, the server 22 and clients 26 run host signal processing drivers which enable multiple processes to occur, some or all of which are real-time processes. An exemplary host signal processing driver is described in U.S. Ser. No. 08/775,385, assigned to the common assignee of the present invention and incorporated hereinabove by reference. Server 22 and clients 26 are minimally computers having PENTIUM 60 MHz central processing units, as commercially available from Intel Corporation of the USA, thereby to perform host signal processing.

As shown in FIG. 2, the control unit 20 comprises a hardware interface 30, a negotiator 32, a data distributor 34, a sample distributor 36 and an arbitrator 38. The hardware interface 30 is physically connected to the phone lines 14 and converts the analog phone signals to digital samples and vice versa. The negotiator 32 controls the communication with the external modem, performing the training session at the beginning of the communication. The operations of negotiator 32 are well known in the art of modems and will not be detailed any further.

The data and sample distributors 34 and 36, respectively, operate together with the processing units 24 to process demodulated data from the modem application 28 and modulated samples from the hardware interface 30. The data distributor 34 directs outgoing data from the modem application 28 to the processing units 24 and incoming demodulated data from the processing units 24 to the modem application 28, all via the LAN 10. Similarly, the sample distributor 36 directs outgoing modulated samples from the processing units 24 to the hardware interface 30 and incoming samples from the hardware interface 30 to the processing units 24, also via the LAN 10. Sample distributor 36 also performs any handshakes necessary during the communication.

When a new communication is begun, the arbitrator 38 determines which processing unit 24 will process the communication. The resultant association of processing unit 24, modem application 28 which is communicating and phone line 14 on which the communication is transmitted is stored in a switching matrix 39 which the arbitrator 38 accesses whenever requested to do so by the distributors 34 and 36.

Each processing unit 24 comprises a driver 40 and a modem processor 42 and is operative on a single one of the multiple modem signals.

The driver 40 directs the received samples or data to the modem processor 42 for demodulation or modulation, respectively. Driver 40 also directs the processed signals (data or samples, respectively) to the relevant data or sample distributor 34 or 36, respectively.

The modem processor 42 performs the actual data modulation or sample demodulation and in this, operates as a "data pump". As is known in the art, the process involves multiple computer-intensive operations, such as equalization, echo cancellation, constellation operations, filtering and carrier modulation or demodulation. The details of the modulation or demodulation operations will not be described herein since they are very well known in the art. For example, the book, *The Theory and Practice of Modem Design,* by John Bingham, describes the operations which a modem task performs and is incorporated herein by reference.

Since client 26, of which modem processor 42 is a part, operates a host signal processing driver, these modem operations are carried out in real-time by the client 26 while other, non-real-time applications also occur. Thus, the user of client 26 generally will not notice that client 26 has been appropriated for processing a modem communication.

In the example of FIG. 2, the user of client 26B is working on a word processor 44. At the same time, the processing unit 24 of client 26B is actively processing a modem communication for the modem application 28 of client 26A. Modem processor 42 provides the results back to driver 40 which directs the demodulated data to data distributor 34 or the modulated samples to the sample distributor 36 for transmission, via hardware interface 30, to the external modem.

As shown in FIG. 2, one processing unit 24 exists on each client 26. However, the number of active processing units 24 is equal to the number of currently active modem communications. When a new communication begins, negotiator 32 performs the initial negotiation, after which, arbitrator 38 selects the processing unit 24 which will process the rest of the communication. The choice can be performed in any of a number of ways. There can be a fixed roster indicating the order for selecting the next client 26 whose processing unit 24 is to be utilized. Alternatively, arbitrator 38 can maintain a short history of the activity of each of the clients 26 and can select the currently least busy client 26 as the next client to utilize. The activity history is typically the number of minutes each client is active on the LAN 10 during a predetermined period of time.

Figure 3:
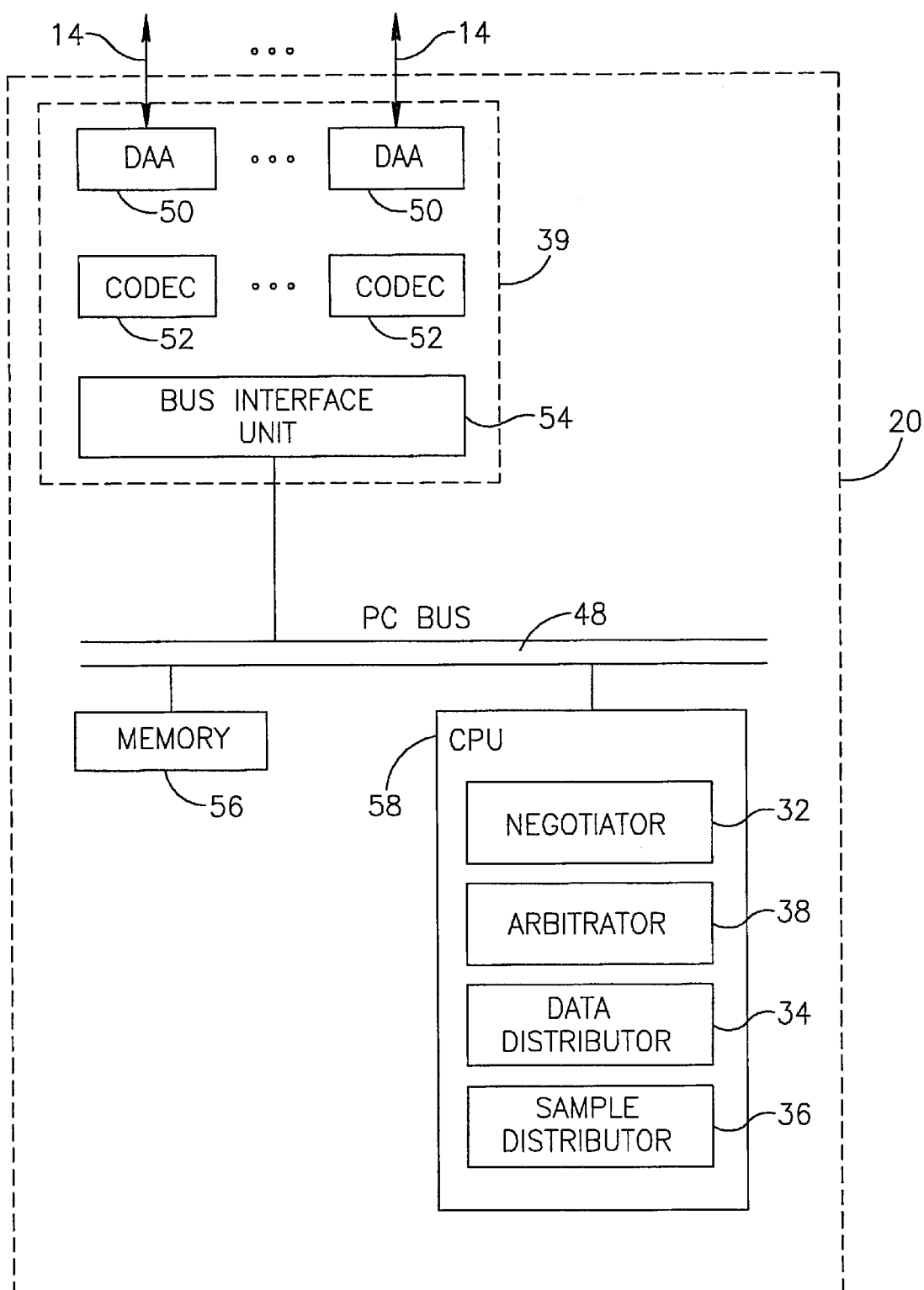
FIG. 3 is a schematic illustration detailing the elements of the multi-line, distributed modem of FIG. 2 which are found on the server.

Reference is now made to FIG. 3 which details the control unit 20 of the multi-line modem of the present invention. FIG. 3 also indicates the configuration of the elements within a personal computer.

The hardware interface 30 is typically an add-on hardware board to the PC which is connected to the PC bus 48 of the PC. The hardware interface 34 typically comprises a data access arrangement (DM) unit 50 and a codec 52 per phone line 14, and one bus interface unit 54. The DAAs 50 and codecs 52 are standard telephony hardware elements. The DAAs 50 provide line protection and the codecs 52 convert between the analog telephone line signals and digital samples. The multiple codecs 52 are connected to the bus interface unit 54 which passes the digital samples to and from the PC bus 48.

Also connected to the PC bus 48 is a storage element 56 and a central processing unit (CPU) 58. Storage element 56 stores the digital samples to be processed or to be transmitted and the switching matrix 39. CPU 58 implements the negotiator 32, the arbitrator 38 and the distributors 34 and 36. As mentioned hereinabove, CPU 58 operates a host signal processing driver under which negotiator 32, arbitrator 38 and distributors 34 and 36 are different processes. Thus, while negotiator 32 converses with external modems, arbitrator 38 and distributors 34 and 36 control the modem processing operations of the currently active modem processors 42.

Figure 4A:
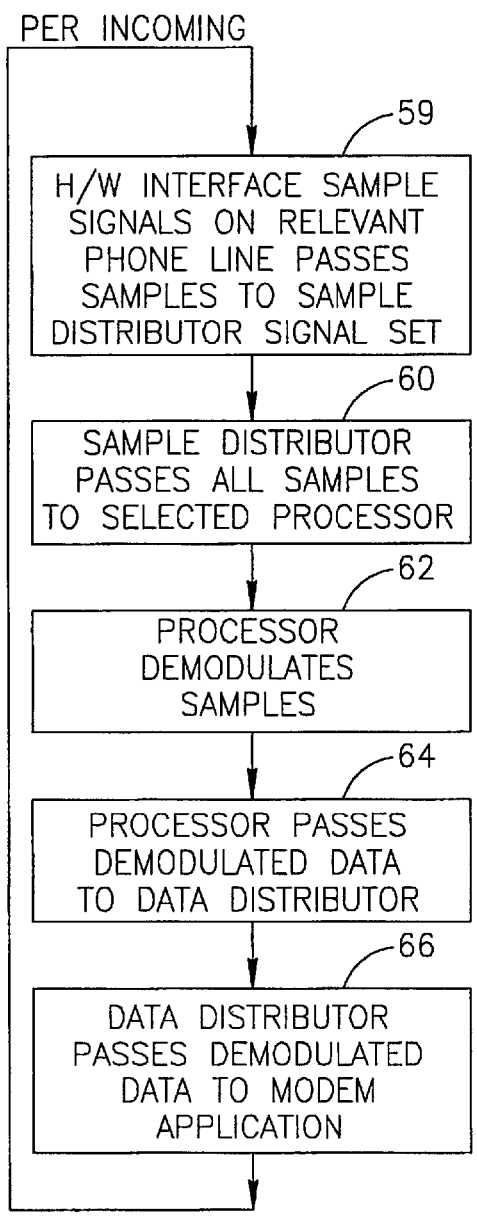
FIGS. 4A and 4B are flow chart illustrations of the modem processing operations of the multi-line modem of FIG. 2 when handling incoming and outgoing packets, respectively.
Figure 4B:
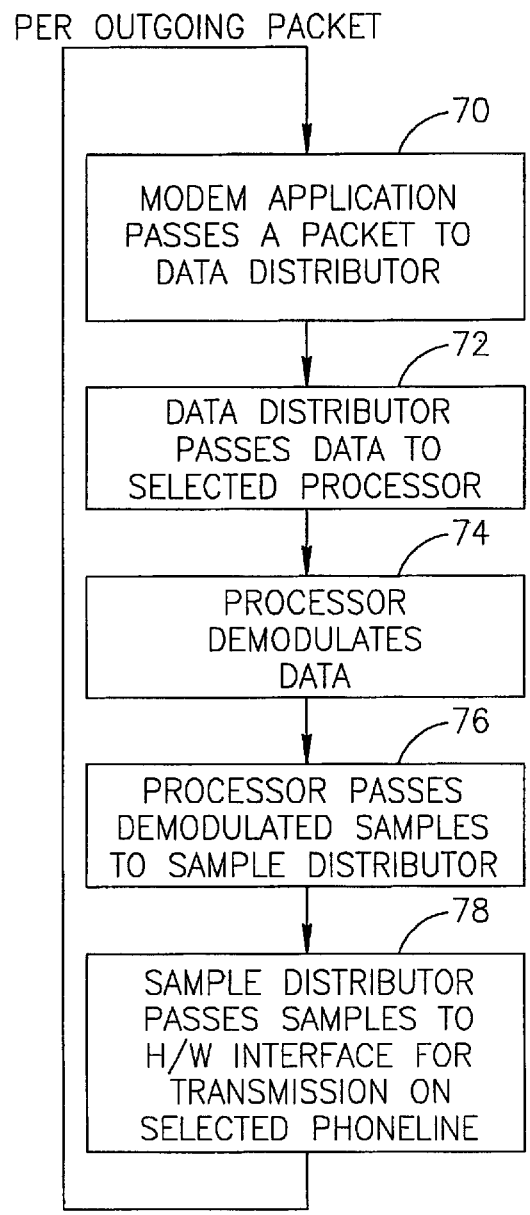

Reference is now made to FIGS. 4A and 4B which illustrate the method of processing a single modem communication.

For each incoming set of samples (FIG. 4A), which typically are the samples related to a data packet, the hardware interface 30 samples, in step 59, the signal on the relevant phone line 14. Hardware interface 30 then passes the samples to the sample distributor 36. The sample distributor 36 then passes, in step 60, all samples of the set to the selected processor 42 which, in turn, demodulates them (step 62). The processor 42 then passes the demodulated data packet to the data distributor 34 (step 64) which, in turn, passes the demodulated data to the relevant modem application 28 (step 66). The process is repeated until the session is terminated.

It will be appreciated that the distributors 34 and 36 access switching matrix 39, via arbitrator 38, in order to distribute the samples and data to the relevant one of the phone line 14, modem application 28 or client 26 associated with the communication.

For outgoing packets (FIG. 4B), the modem application 28 passes (step 70) its packet of data to data distributor 34 which, in turn, passes (step 72) the data to the associated processor 42. Once the processor 42 has modulated the data (step 74), it passes the modulated samples to the sample distributor 36 (step 76) which, in turn, passes (step 78) the modulated samples to the hardware interface 34 for transmission on the associated phone line 14.

Figure 5:
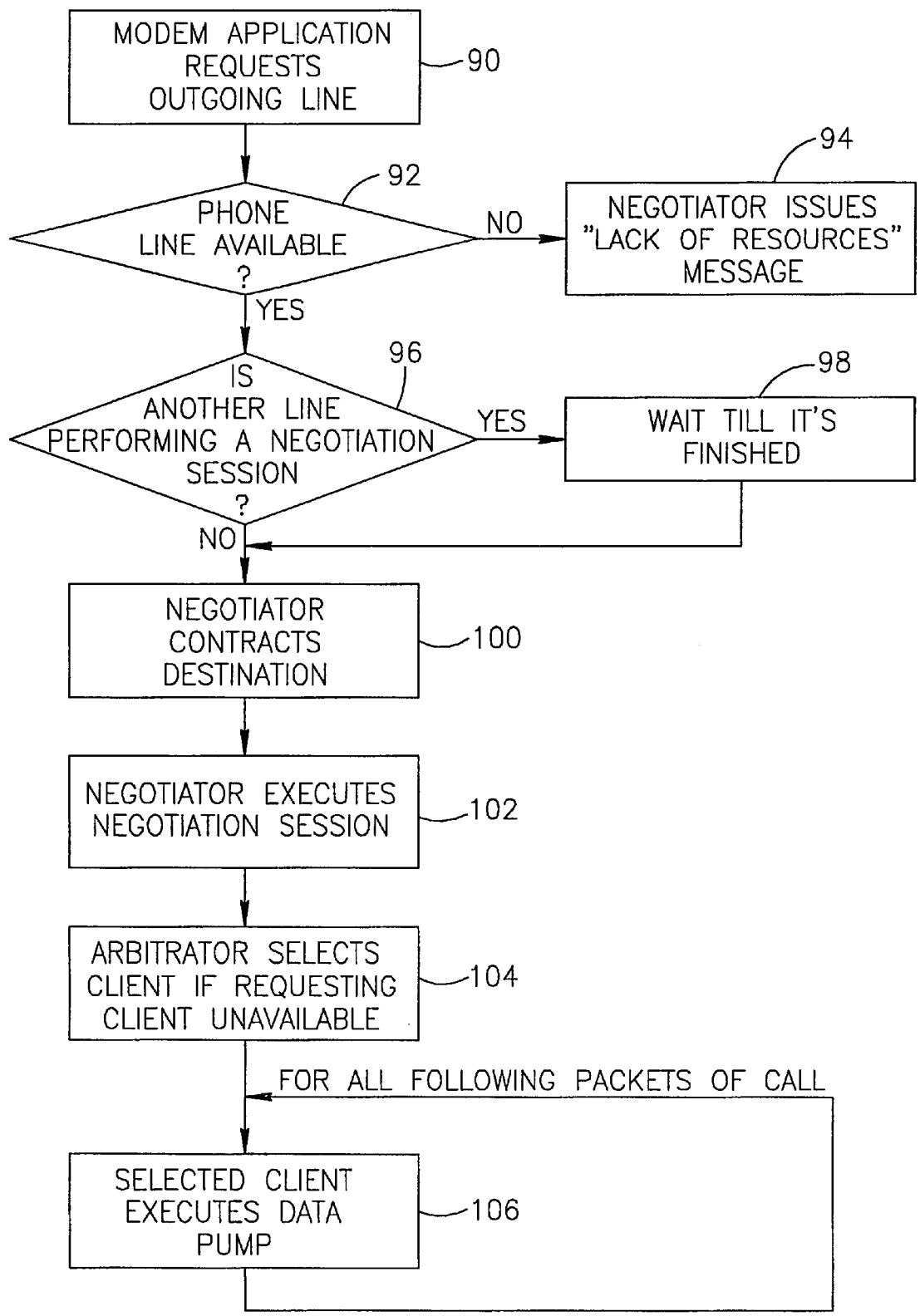
FIG. 5 is a flow chart illustration of the operations of the multi-line modem of FIG. 2 when handling outgoing calls.
Figure 6:
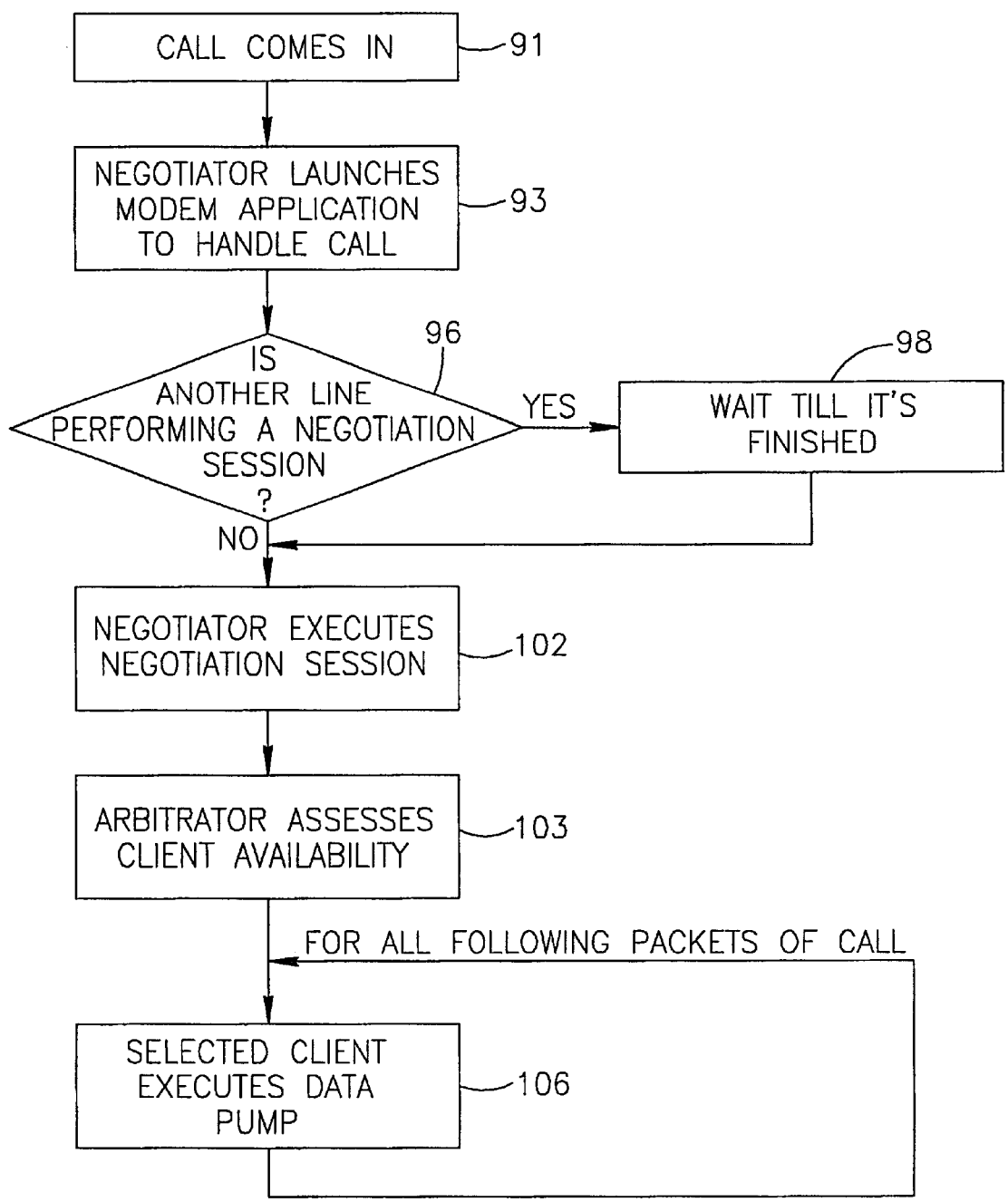
FIG. 6 is a flow chart illustration of the operations of the multi-line modem of FIG. 2 when handling incoming calls.

Reference is now made to FIGS. 5 and 6 which illustrate the operations of the multi-line modem of the present invention for outgoing and incoming calls, respectively.

Outgoing calls (FIG. 5) begin with a request from a modem application 28 for an outgoing phone line (step 90). If negotiator 32 determines (step 92) that no phone line is available, negotiator 32 issues (step 94) a "lack of resources" message indicating to modem application 28 to try again later. Otherwise, negotiator 32 determines (step 96) if it is performing a negotiation session on another line. If so, modem application 28 has to wait (step 98) until negotiator 32 finishes the previous negotiation session.

Otherwise, negotiator 32 contacts (step 100) the destination modem and then executes (step 102) the negotiation session with the destination modem. Once the negotiation session is finished, arbitrator 38 selects (step 104) the client to process the communication. Typically, this will be the client 26 whose modem application 28 requested the outgoing line. However, it is possible that the requesting client is already processing a communication, in which case, the arbitrator 38 must select a different client to process the communication. The selection process is the same or similar to the one discussed hereinabove. When the selection is finished, arbitrator 38 stores an identification of the selected client 26, the phone line 14 carrying the communication and the modem application 28 receiving the communication in the switching matrix 39.

Finally, for all packets of the communication, the selected client 26 executes (step 106) the data pump, described hereinabove with respect to FIGS. 4A and 4B, in conjunction with the distributors 34 and 36.

When a new call comes in (step 91 of FIG. 6), negotiator 32 first responds to the telephone ring and then launches a modem application 28 (step 93), either on the server 22 or on one of the clients 26, which will handle the new communication. As for outgoing calls, negotiator 32 then determines (step 96) if it is performing a negotiation session on another line. If so, modem application 28 has to wait (step 98) until negotiator 32 finishes the previous negotiation session. Otherwise, negotiator 32 performs the negotiation.

Before the negotiation is successfully finished, arbitrator 38 assesses (step 103) the availability, as described hereinabove, of the clients 26 which are not already processing modem communications. The arbitrator 38 activates the selected client 26, stores the identification information for the communication, and then begins processing the communication itself. This involves executing (step 106) the data pump, described hereinabove in FIGS. 4A and 4B, with the selected client 26 for each packet (incoming or outgoing) associated with the communication.

Figure 7:
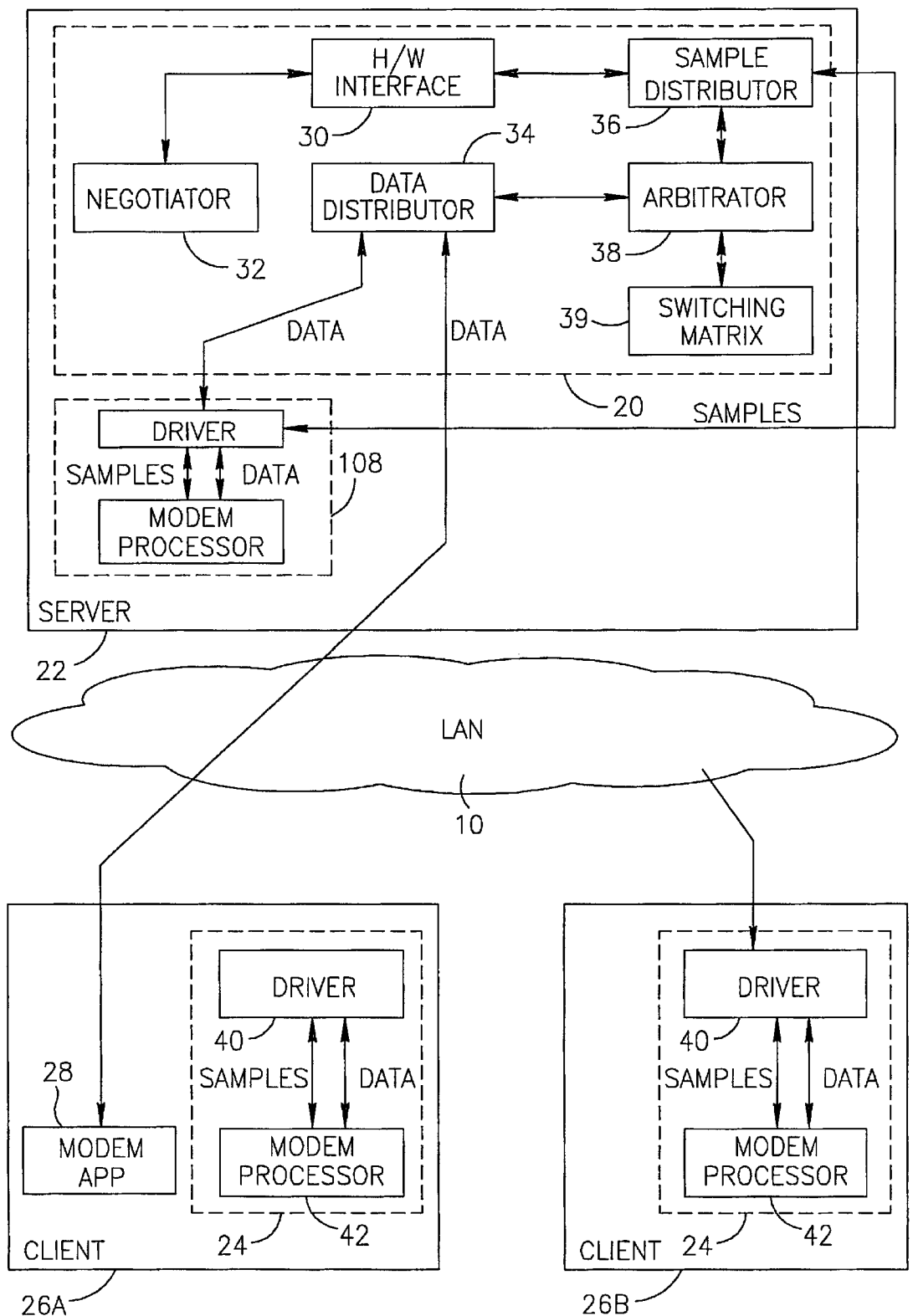
FIG. 7 is a block diagram illustration of an alternative embodiment of the multi-line distributed modem of the present invention.

Reference is now briefly made to FIG. 7 which illustrates an alternative embodiment of the present invention in which there are one or more processing units, labeled 108, on the server 22, in addition to or instead of the processing units 24 on the clients 26. Processing units 108 operate the same as processing units 24.

The operation of the embodiment of FIG. 7 is the same as described hereinabove for the embodiment of processing units 24 only on clients 26; however, in this embodiment the server 22 also implements a processing unit 108. This embodiment requires that server 22 have significant computer processing power, such as is available in a PENTIUM 133 MHz computer, in order to run the multiple real-time processes of the control unit 20 and the processing unit or units 108.

Figure 8:
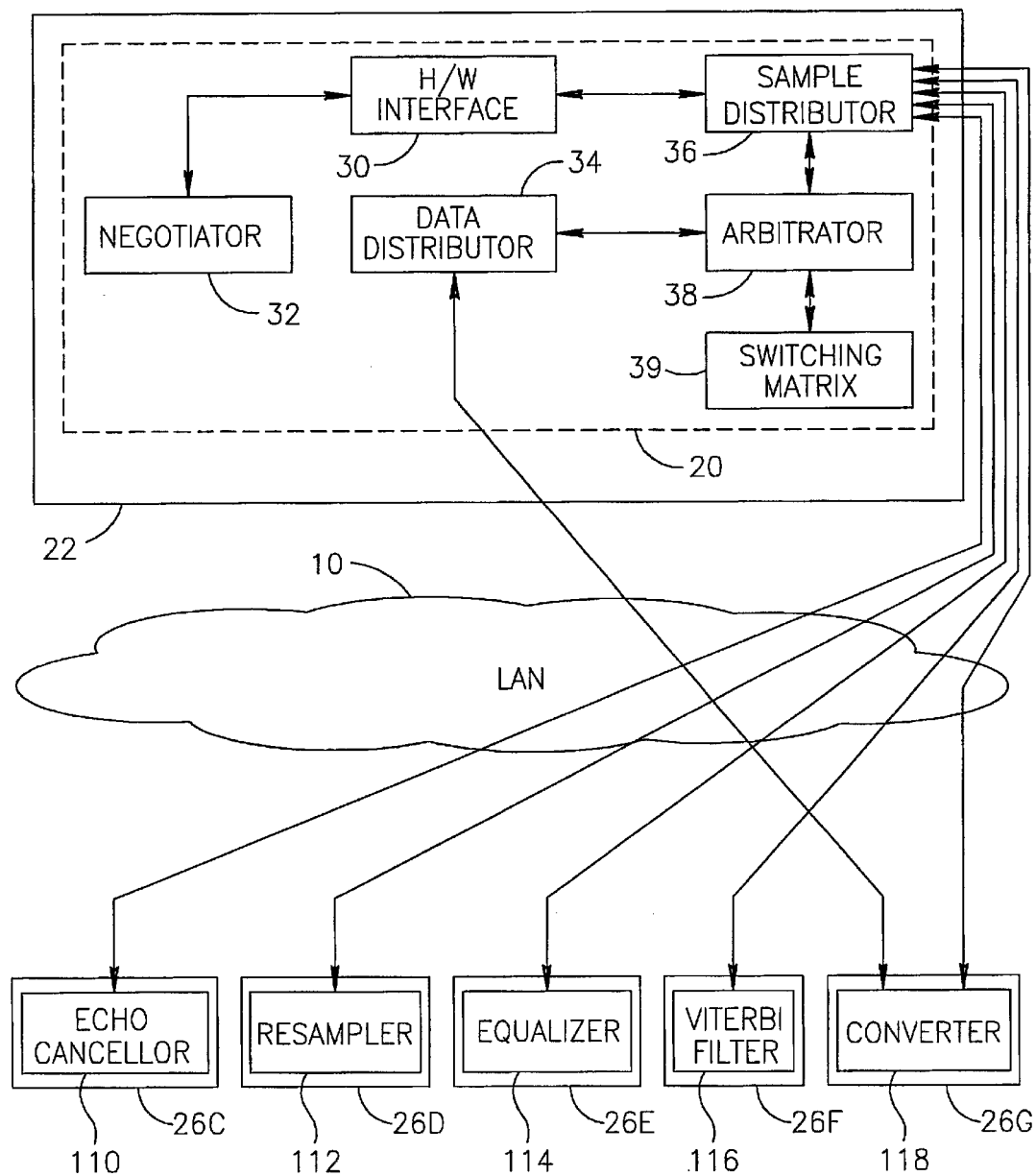
FIG. 8 is a block diagram illustration of a further alternative embodiment of the multi-line distributed modem of the present invention.

Reference is now made to FIG. 8 which illustrates a further alternative embodiment of the present invention in which the modem processing is spread over multiple clients, each responsible for one portion of the processing operation. It will be appreciated that the modem of FIG. 8 is useful as a multi-line modem, operating with multiple phone lines, or as a single line modem.

FIG. 8 shows an example where the modem operation is divided into five operations, as follows: echo cancellation, resampling, equalization, Viterbi filtering and data-to-sample conversion. According to this second embodiment, each client 26 is responsible for only one of the modem suboperations. Thus, as shown in FIG. 8, client 26C implements an echo canceller 110, client 26D implements a resampler 112, client 26E implements an equalizer 114, client 26F implements a Viterbi filter 116 and client 26G implements a data-to-sample converter 118. Echo canceller 110, resampler 112, equalizer 114 and Viterbi filter 116 communicate only with the sample distributor 36. Converter 118 converts between data and samples and thus, communicates with both distributors 34 and 36.

The five processors 110–118, spread among the five clients 26C–26G, together form the modem processor of the previous embodiments. Thus, each processor 110–118 operates on all of the currently active communication channels.

Each packet passes through all five processors 110–118 with an indication of the channel to which it belongs.

It will be appreciated that any type of real-time task can be performed in a distributed manner as shown hereinabove, either by assigning one processing unit per task or by assigning one processing unit per stage of a task. In the latter embodiment, each processing unit performs its operation for all active tasks.

Figure 9A:
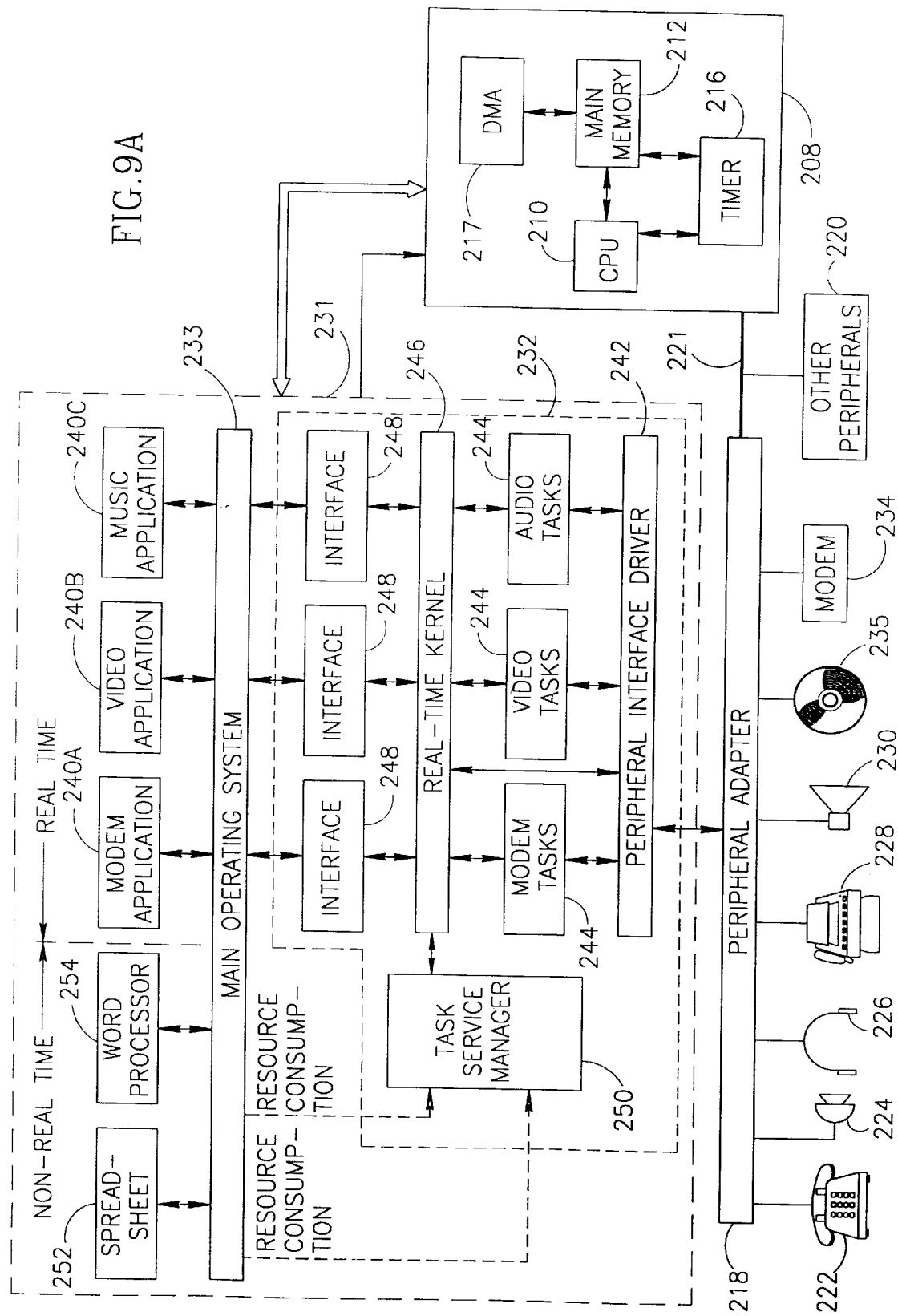
FIG. 9A is a block diagram illustration of a gracefully changing real- and non-real-time controlling personal computer system, constructed and operative in accordance with a preferred embodiment of the present invention.
Figure 9B:
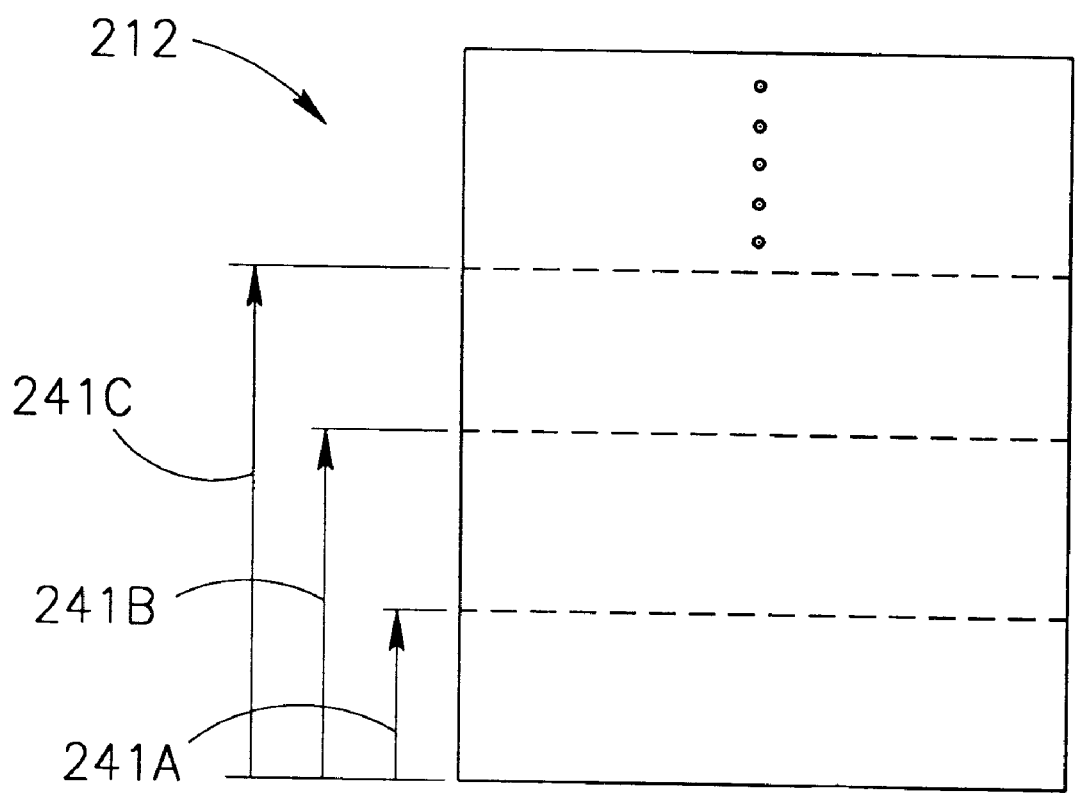
FIG. 9B is a schematic illustration of the organization of the main memory of the system of FIG. 9A into buffers.

Reference is now made to FIGS. 9A and 9B which illustrate a personal computer system which gracefully changes real-time operations in the presence of non-real-time operations, constructed and operative in accordance with a preferred embodiment of the present invention. It will be appreciated that, for the present discussion, the term "non-modem task" indicates either a non-modem task or any modem task not being controlled by the real-time manager of the present invention.

The system comprises a computer system 208, formed of a central processing unit (CPU) 210, a main memory 212, a timer 216, a direct memory access (DMA) unit 217 and a real-time peripheral adapter 218. The system can also include other, non-real-time peripherals 218. The peripherals 218 and 220 are connected to a local bus 221 to which the CPU 210 and main memory 212 are connected.

The CPU 210 is one whose speed enables it to perform at least some real-time operations, for example, a 80486 or a PENTIUM CPU, both manufactured by Intel Corporation. The local bus 221 can, for example, be a personal computer interface (PCI) bus.

The real-time peripheral adapter 218 is a PC card or subsystem which has connections for a multiplicity of real-time devices, such as a telephone 222, a microphone 224, a headset 226, a computer facsimile machine 228, a speaker 230, a CD-ROM 235 and a modem 234. The adapter 218 provides an interface to the multiple real-time devices, converting their analog signals to and from the digital ones required by the CPU 210 and providing the digital signals to the main memory 212 for real-time processing by CPU 210. Typically the DMA 217 transfers the data into separate buffers within main memory 212, as described hereinbelow with respect to FIG. 9B. The adapter 218 also provides some signal processing and buffering, as described hereinbelow.

The block labeled 231 illustrates the operations performed by the computer system 8. As in the prior art. a main operating system 233, such as WINDOWS 3.1 or DOS, both manufactured by Microsoft Corporation of the USA, controls the operations of the entire system and specifically, of the non-real-time applications. Such non-real-time operations include word processing 254, spreadsheet calculations 252, some games, etc.

In accordance with the present invention, the main operating system 233 operates in conjunction with a gracefully changing real-time controller 232 which controls the operations of the real-time devices connected to the peripheral adapter 218 and provides their input to the main operating system 233. Operating system 233 then provides the data to the applications 240 operating in conjunction with the relevant real-time devices 222–235.

Controller 232 enables the CPU 210 to perform real-time operations while non-real-time operations occur, while minimally affecting the speed at which the non-real-time operations occur. For example, assume that the computer user wants to write a letter, in his word processor, while receiving a facsimile message and an electronic mail message as background operations. The facsimile and electronic mail messages are received via the computer facsimile machine 228 and the modem 234, respectively, both of which require real-time responses. The word processing operation, however, does not require real-time operation though it does require a reasonable response time (e.g. it must respond at least as fast as the user can type). CPU 210 is fast enough that, most of the time, the operations can occur simultaneously without interfering with each other. However, there are periods, whether long or short, when all three operations will require the full processing power of the CPU 210, at which point, the CPU 210 will work slowly on all operations. This is particularly annoying to the user, who expects the word processor to respond within a reasonable amount of time and it can be disastrous to the real-time operations of the facsimile and modem who must respond within predetermined, short periods of time or else they will be disconnected.

Therefore, in accordance with a preferred embodiment of the present invention, in the presence of overuse of the CPU 210, the controller 232 gracefully changes the operations of the currently active real-time devices. As described hereinabove, the term "graceful change" means maintaining the real-time operations but at a lower quality. For example, if the real-time operation is a facsimile transfer, the rate at which bits are transferred may be reduced. If the real-time operation is the playback of an audio signal, it may gracefully degrade from 44 KHz stereo to 22 KHz stereo to 22 KHz mono playback.

However, the speed of the application which interfaces with the user, which typically is a non-real-time operation, will be minimally reduced. Instead, the speed of the background operations, which are the real-time operations, will be reduced.

FIG. 9A illustrates the layers of operation of controller 232, beginning with its interface with the peripheral adapter 218 through to its interface with the various real-time applications, labeled 240a, 240b and 240c. FIG. 9B illustrates the adjustable sized main memory 212 having buffers 241a, 241b, 241c, of different sizes.

Controller 232 (FIG. 9A) comprises a peripheral interface driver 242, various tasks 244 for processing different types of real-time data, such as modem, video and audio data, a kernel 246, interfaces 248 to the real-time applications 240 and a task service manager 250 for controlling the operation of the other elements in controller 232. The buffer 241 is an adjustable sized buffer into which all data is placed. The size of the buffer is a function of the number of active tasks and the amount of data each task receives, or can receive, during a given period of time, such as one second. As discussed hereinbelow in more detail, the amount of data to be received is, for some tasks, a function of the service level at which the task is operating.

For example, the modem receives 2400 symbols per second irrespective of the service level, as described hereinbelow. Thus, the buffer 241 needs to be 2400 bits large if only the modem is operating. If, at the same time, the audio unit is operating at 44 KHz, then the buffer 241 has to increase in size by an additional 176 Kilobits. In FIG. 9B, buffer 241a is operative for a single active task, buffer 241b is operative for two active tasks and buffer 241c is operative for three active tasks.

Driver 242 controls the operation of the peripheral adapter 218, indicating to it when to transfer digitized data to and from the buffer 241 of the main memory 212 and to and from the various real-time devices to which the adapter 218 is connected. Driver 242 enables data transfer into buffer 241 until it is full; once the entire buffer 241 is full, the DMA 217 produces an interrupt.

The various tasks 244 process the digitized data as required (i.e. fax data is processed differently than audio data, etc.), such as demodulating/modulating, filtering and/or compressing/decompressing. The tasks 244 also perform any handshaking operations required by the devices which are sending the data. In effect, tasks 244 perform the operations typically performed by the real-time cards of the prior art; however, in the present invention, tasks 244 are implemented within the CPU 210. The book, *The Theory and Practice of Modem Design,* by John Bingham, describes the operations which a modem task performs and is incorporated herein by reference.

The kernel 246 can be any suitable kernel or scheduler which can operate with a personal computer CPU 210. For example, the IA-SPOX kernel, commercially available from Spectron MicroSystems Inc. of Goleta, Calif., USA, is suitable. Kernel 246 allows creation and/or invocation of modem tasks, and of timing, external and internal events. The system 246 also assigns priorities and events to tasks and will supervise the execution of modem tasks based on the attributes (list order, priority, events) assigned to each task. Each event is defined as either a packet of data which the real-time device has to process or an invocation operation. Each task is defined as the processing of packets of data, within the time constraints, for one of the real-time devices. Finally, kernel 246 provides the processed data from the tasks 244 to the applications 240, via interfaces 248.

Task service manager 250 manages the operations of the kernel 246, the tasks 244 and the driver 242 so that the real-time applications can generally smoothly operate with the non-real-time, user applications. In the WINDOWS environment, unit 250 is a virtual driver (V×D) which is invoked by a "buffer full" interrupt, by the timer 216, by an external event interrupt, such as a telephone ring, or by an application 240.

As described in more detail hereinbelow with respect to FIG. 11, unit 250 receives information regarding the resource consumption of each of the user applications, such as spreadsheet 252 and word processor 254, from the main operating system 233 and utilizes expected resource consumption information to determine the resource requirements of the currently active real-time operations. From this information, unit 250 determines how to allocate time to the various applications during a predetermined time period, where the user applications receive priority.

FIG. 10, to which reference is now briefly made, illustrates the sharing of the resources for a predetermined time period T. The time period T begins with an interrupt 239 at which point real-time controller 232 receives control from the operating system 233. Real-time controller 232 operates during the first portion 243 of the time period T, returning control to the operating system 233 at the end of portion 243. Operating system 233 then controls the operation of the computer system 208 (portion 245) until receipt of a further interrupt 239.

The length of the period T is determined such that a) the number of interrupts will be minimized and b) the latency requirements of the expected tasks are satisfied. Once T is set, the size of the required buffers of the various tasks are fixed per service layer, thereby fixing the length of portion 243 for the various combinations of active tasks.

The length of portion 243 is, as mentioned before, determined by unit 250 based on the current need for resources. During portion 243, unit 250 controls the approximate timing of the various real-time operations (see portions 247 and 249).

Unit 250 is invoked by predetermined types of external events, such as a telephone ring, or by one of applications 240 when it begins to require real-time activity. Unit 250 can also be invoked periodically by timer 216 or, when buffer 241 becomes full. All of these events can produce interrupts 239.

The amount of data within buffer 241 has to be processed during each portion 243. Therefore, the size of buffer 241 is adjustably selected to correspond, approximately, with the amount of data which can be processed during the current expected length of portion 243. Typically, though not necessarily, the more tasks that are currently active, the larger the buffer is.

Unit 250 allocates the resources of CPU 210 by assigning tasks to different slots, such as time slots 247 and 249, in conjunction with the kernel 246. The assignment of time slots is based on the type of operation requiring the resources of CPU 210 a nd the expected resource requirements for that operation. As discussed herein, unit 250 changes the operations of the real-time devices as a function of the resource requirements of the user applications. The service level change commands are provided directly to the relevant task 244 which, in response, reduces the service level of the operation performed. When fewer resources are required, unit 250 commands the relevant tasks 244 to increase the level of the operation performed, where the ordering of the levels is in accordance with how much data must be processed during a given length of time.

Reference is now to FIG. 11 which illustrates the elements of the task service manager 250. Unit 250 typically comprises an invocation interpreter 260, a task table 262, a performance monitor 266 and a time allocater 268.

Invocation interpreter 260 receives invocation events, determines whether they come from an application 240, an interrupt 239, the buffer 241, or timer 216, as shown in FIG. 11, and determines the proper response in accordance with the type of event received. Invocation interpreter 260 also determines to which task 244 each event belongs and what type of event they represent. For example, an event could be data to b e processed, handshake data, or initial communication data. Unit 250 responds differently depending on the type of the event.

Task table 262 stores a list of all potential modem tasks which the personal computer might perform. This list is based on the type of real-time devices currently connected to the peripheral adapter 218. For each potential task, table 262 lists the type of event(s) which invoke the task, an estimated required runtime for the task at a plurality of service levels and the size of the buffer required for each service level. For example, the levels might be for full, medium and low performance. The tasks can also be listed as a function of the type of CPU.

The performance monitor 266 utilizes performance counters, such as are part of the PENTIUM CPU, which monitor the operation of the CPU and count the occurrence of a predetermined set of events. These performance counters are typically used for code optimization, as discussed in the article "Pentium Secrets" by Terje Mathisen and published in *Byte* Magazine, July 1994, pp. 191–192. The article is incorporated herein by reference.

For the present invention, the performance counters are utilized to indicate the useful loading of the CPU 210, where the term "useful" indicates that the CPU 210 is busy processing or transferring data and not just running in a loop waiting for events to happen. For example, the performance monitor 266 can monitor performance counters which count data writes and bus activity, both of which indicate significant activity of the CPU. The performance monitor 266 can also monitor the number of multimedia (MMX) instructions of Intel currently implemented in the PENTIUM and PENTIUM Pro microprocessors.

For example, the performance monitor 266 can determine the value of the following function for performance Perf:

$$\text{Perf} = \sqrt{\left(\frac{\text{measured data write}}{\text{idle data write}}\right)^2 + \left(\frac{\text{measured bus activity}}{\text{idle bus activity}}\right)^2 + \left(\frac{\text{measured FP instructions}}{\text{idle FP instructions}}\right)^2} \qquad 1$$

where "measured data writes", "measured bus activity" and "measured FP (floating point) instructions" are the outputs of the counters and "idle data writes", "idle bus activity" and "idle FP instructions" are normalizing values based on the activity of the CPU when no tasks are occurring (i.e. during their idle time).

The monitor 266 reads the values of the counters and resets them as necessary. Based on the values of the counters, the monitor 266 determines, via equation 1, the percentage of effective time which the CPU 120 needs to spend on user applications with the remaining time to be spent on real-time operations.

Monitor 266 also maintains a history of the values of the counters. By analyzing their changing values and by knowing, from task table 262, the expected runtime for each task, monitor 266 can determine if there is an instantaneous peak in the load on the CPU 210 or if the current rate will be sustained for some time.

The performance monitor 266 also monitors the activity level of the modems. This is of particular concern since a modem might be activated but not busy transferring data. For example, although a user might be connected, via the modem, to a network, the user might be reviewing the data recently downloaded, preparing an Email message, etc. . . During this idle time, the modem is active but does not do anything useful for the user and thus, its activity level should be degraded. Therefore, the performance monitor 266 receives activity level information from the modem application 240A indicating when the modem is actively transferring data.

The time allocater 268 utilizes the output of the performance monitor 266 and task table 262 to approximately allocate the various tasks to time slots within a predefined time period, as described in more detail hereinbelow with respect to FIG. 15. In addition, unit 268 determines when a real-time device has to reduce (or increase) the level of its performance as a function of how active the user (i.e. non-real-time) applications currently are. This graceful changing of task service levels enables all tasks to continue operating under most CPU loading constraints.

Reference is now made to FIGS. 12A, 12B, 13A, 13B, 13C and 13D which provide one example of graceful service level reduction which is useful for modem communications. For all modem communications, there is a sending modem 270 and a receiving modem 272 which communicate along a data line 273. The sending modem 270 converts the binary data, which has bits having either a one or zero value, into symbols of a few bits each. The modem 270 then converts the digital symbol signal into an analog one having a modulated carrier signal. The carrier signal is at a given frequency and the modulation typically changes the phase and amplitude of the carrier signal in accordance with the values of the symbols being transmitted. The number of possible phase/amplitude combinations is dependent on the number of possible symbol values and is known as the constellation 271. FIG. 12A illustrates that the sending modem has two constellations 271a and 271b. The constellations shown can be part of the V.32bis or V.34 standards.

Figure 13D:
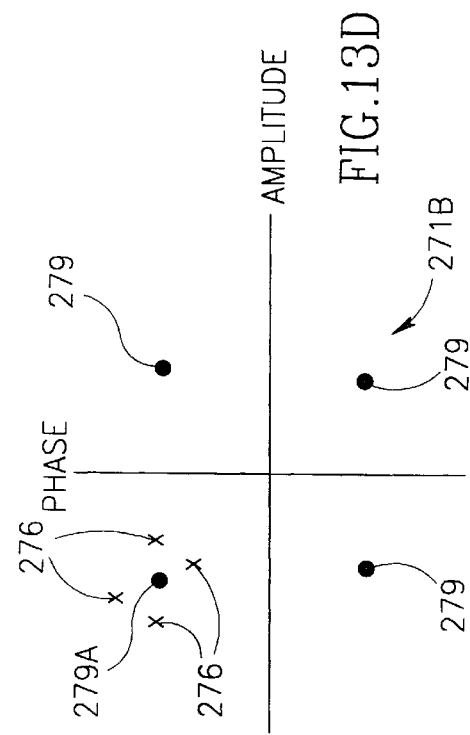
FIGS. 13A, 13B, 13C and 13D are graphical illustrations of modem bit constellations, useful in understanding the operations of the modems of FIGS. 12A and 12B.
Figure 13C:
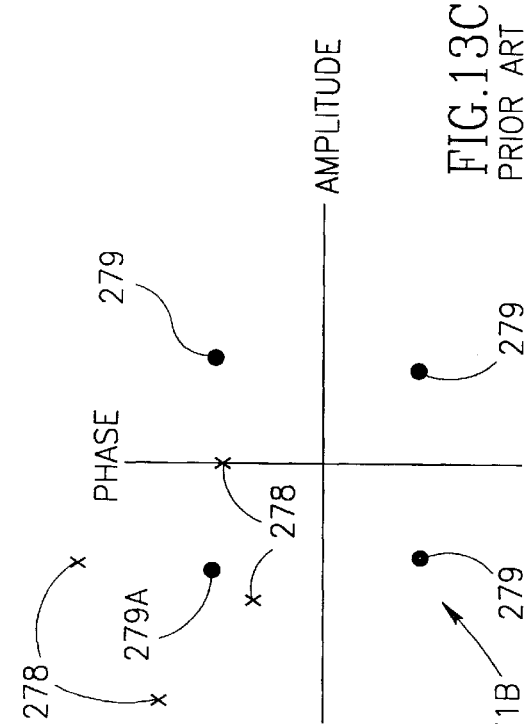
Figure 13A:
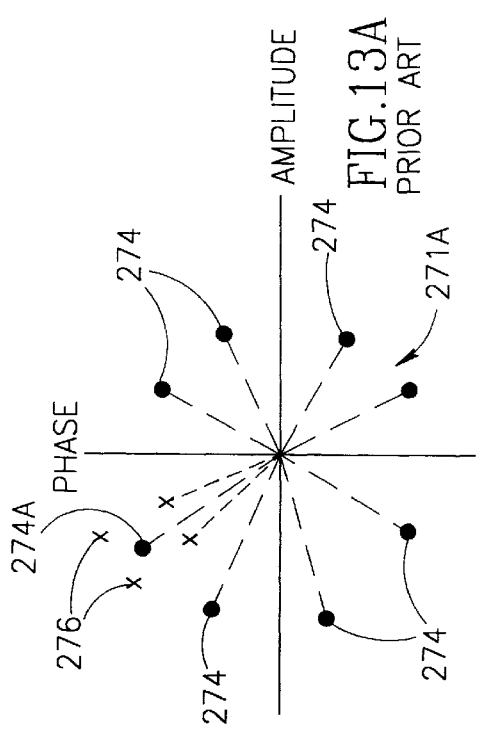

FIG. 13A illustrates the constellation 271a of amplitudes and phases possible for eight symbols on an amplitude-phase graph. Each point 274 corresponds to a different one of the eight possible symbol values. The points 274 are evenly spread throughout the graph and there are two points 274 per quadrant.

The receiving modem 272 typically receives the modulated signal imperfectly. Thus, it might receive data representing symbol value 274a as any one of the x's 276. The receiving modem 272 analyzes the x's 276 and determines that they are closest to the symbol value 74a and thus, receiving modem 272 converts the x's 276 to the symbol value represented by point 74a.

Figure 13B:
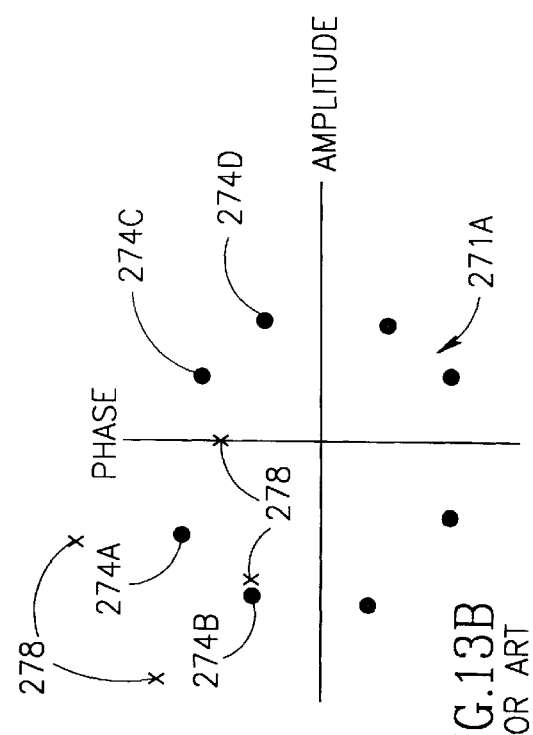

If the line 273 was noisy, as indicated by line 273b, the received symbol values representing symbol value 274a might fall anywhere within the graph. This is shown in FIG. 13B wherein the four received symbol values (x's 278) are located within the first and second quadrants. In this situation, the received symbol values 278 might be recognized as any one of the four symbol values 274a–274d. This is obviously incorrect. Therefore, in the prior art, the constellation is changed to constellation 271b, which has fewer symbol values, whenever the line 273 was noisy.

The result is shown in FIG. 13C. The constellation 271b has one symbol value (labeled 279) per quadrant, where the symbol values 279 are a subset of the symbol values 274 of FIGS. 13A and 13B. The four noisily received symbol values 278 are now close to symbol value 279a and thus, will be recognized as such. It will be appreciated that the amount of processing required to recognize the noisily received symbol values 278 is about the same as the amount of processing required to recognize the cleanly received symbol values 276.

Constellation 271b is of a reduced service level since only four symbol values can be recognized. Four symbols represent the possible combinations of only two bits whereas eight symbol values represent the possible combinations of three bits. Thus, when the constellation of FIG. 13C is operative, the bit rate (or rate at which bits are transmitted) is less.

Applicants have realized that, if the line is clean, the amount of processing required to recognize a symbol value within the reduced constellation 271b is less than that required to recognize a symbol value within the larger constellation 271a. If, as shown in FIG. 13D, constellation 271b, with only four symbol values 279, is utilized, since the line 273 is clean, the received symbol values 276 are tightly clustered around symbol value 279a. Furthermore, the other symbol values 279 are quite distant from symbol value 279a. Thus, the filters (e.g. echo cancelers, equalizers, etc.) which determine if symbol value 279a was sent or if it was another symbol value 279 do not need to be very accurate. Therefore, the filters and other processing elements needed to recognize received symbol values 276 as symbol value 279a can be less accurate than for constellation 271a and reduced accuracy typically means less processing time. However, the service level is lower since the resultant baud rate is low, even though the line is clean.

Specifically, the filters of a modem are typically finite impulse response (FIR) filters which have a plurality of "taps", or coefficients, which define the shape of the filter. The higher the accuracy of the filter, the more taps there are and the more processing power required to implement the filter.

Most of the digital filter formula's are of the kind:

$$y(n) = \sum_{i=0}^{N} a_i x(n-i) \quad (2)$$

where y(n) is the output signal, x(n) is the input signal, the $a_i$ are the coefficients or taps of the filter and N is the number of taps of the filter. The length N determines the accuracy of the filter. Normal filters are of length 100 and above. The coefficients $a_i$ are not constant and are typically recalculated periodically, based on the varying line conditions. The re-calculation process is typically lengthy.

There are three possible mechanisms for reducing the computation load of the modem. The length N of the filter can be reduced (thereby reducing the accuracy of the modem), the re-calculation of the coefficients can occur less frequently or the symbol rate can be reduced.

In accordance with a preferred embodiment of the present invention, whenever more time needs to be allocated to the user applications, time allocater 268 indicates to the modem task 244 to change to smaller constellation 271b. This is true even though the communication line 273 is not noisy.

FIG. 12B illustrates communication in accordance with the present invention. The present invention utilizes sending modem 270 with its modem processor, labeled receiving modem 280. Whenever the receiving modem 280 has enough processing capability, the two modems operate with constellation 271a and receiving modem 280 utilizes high resolution processing, labeled 282, with the full set of filter coefficients. When receiving modem 280 needs less processing capability, it indicates such to sending modem 280 which then switches to constellation 271b. Receiving modem 280, in turn, switches to low resolution processing, labeled 284, with a smaller set of filter coefficients.

FIG. 12B illustrates a further form of graceful reduction in modem service level useful whenever there are spikes in the amount of CPU processing time necessary. This involves operating low resolution filters 284 on constellation 271a. In this service level, the processing time will be reduced but the error rate will go up. Such a situation is acceptable only if it is present for a short time.

FIG. 12B illustrates a still further form of graceful reduction which reduces the symbol rate without changing the processing level. Thus, a further degradation occurs with constellation 271B is utilized with the high resolution filters 282. This reduces processing time although not as much as by utilizing low resolution filters 284.

A modem can also momentarily degrade the service level by not acknowledging receipt of data, thereby requiring the sending modem to retransmit the data. Some processing is required but far less than if the data was received. The result is a slower rate of data transfer and, accordingly, less computation per a given length of time.

Other types of graceful reduction in service level include: changing an audio signal from 44 KHz stereo to 22 KHz stereo to 22 KHz mono playback and changing the frame rate of a video signal. Both reductions affect the amount of data received at any one time, and thus, changing the service level requires changing the size of the buffer 241. It will be appreciated that modems transfer the same number, typically 2400 baud, of phase/amplitude combinations per second with all constellations. The constellation is what increases and decreases the resultant baud rate.

In addition, it will be appreciated that, for video signals compressed in accordance with the Motion Pictures Expert Group (MPEG) standard, the service level can be reduced by not compressing the images which come between two main frames (i.e. by transferring only every X frames). On the decompression side, the present invention can only decompress those frames, known as I frames, which are fully compressed.

Figure 14A:
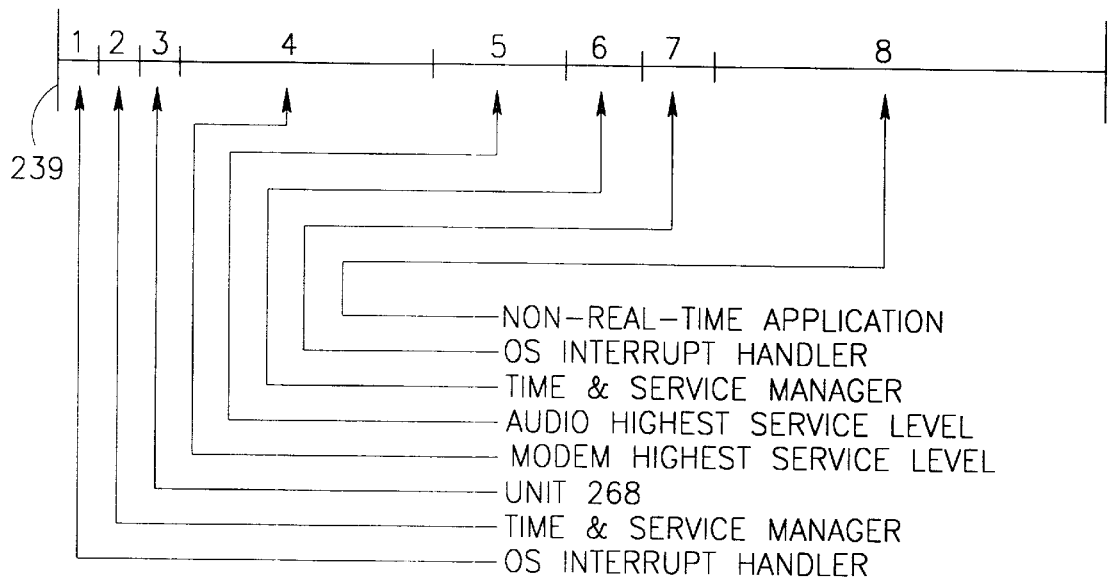
FIGS. 14A, 14B, 14C and 14D are timing diagrams of four possible scenarios of operation of the system of FIG. 9A.
Figure 14B:
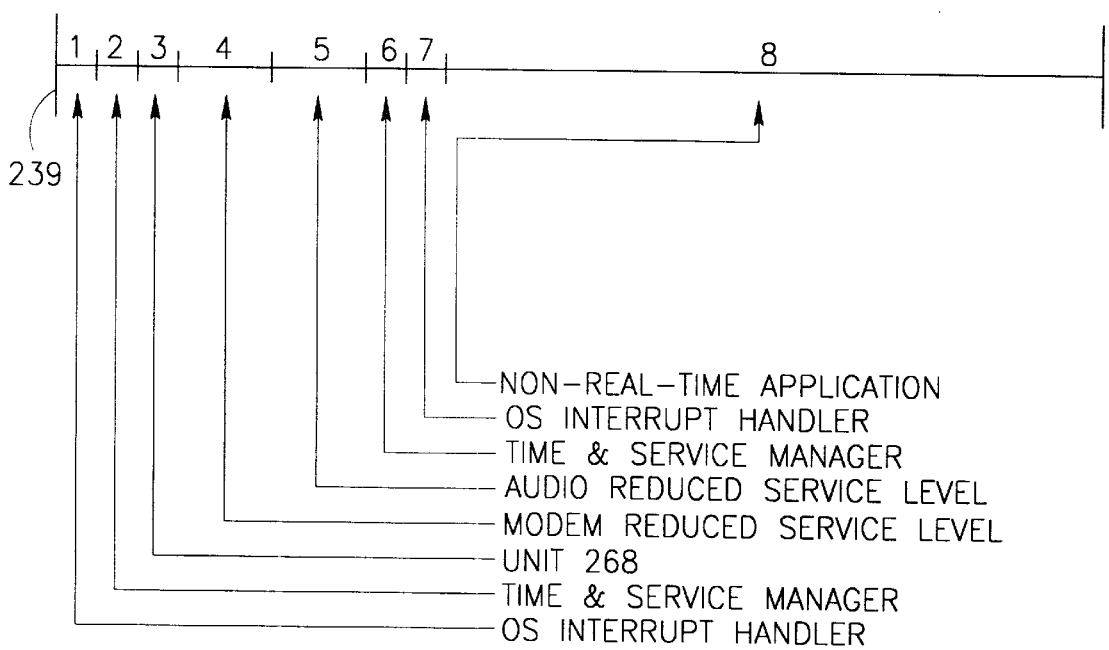
Figure 14C:
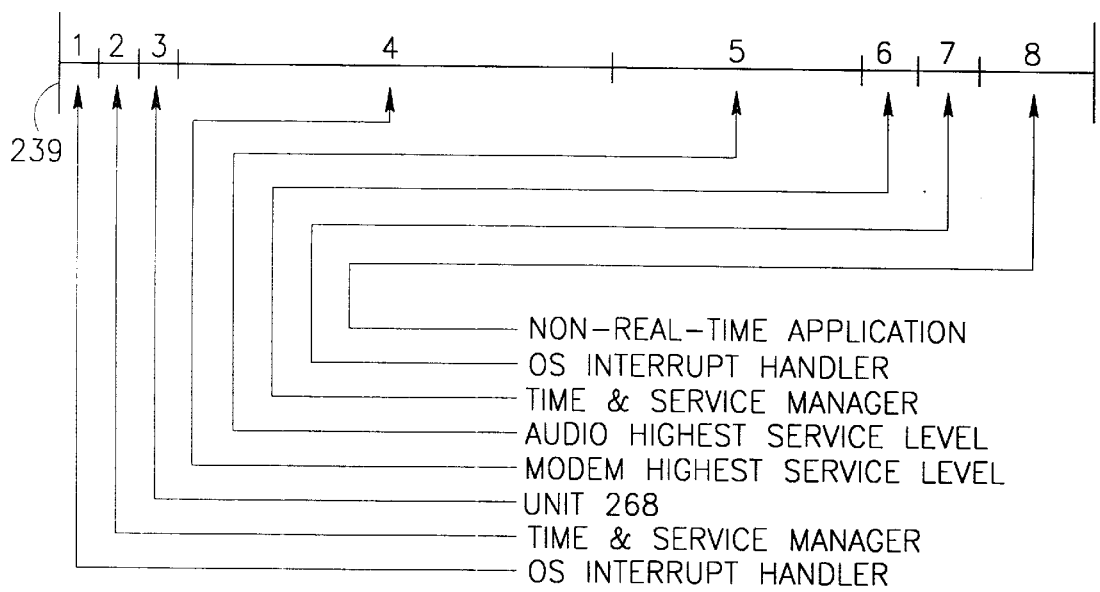
Figure 14D:
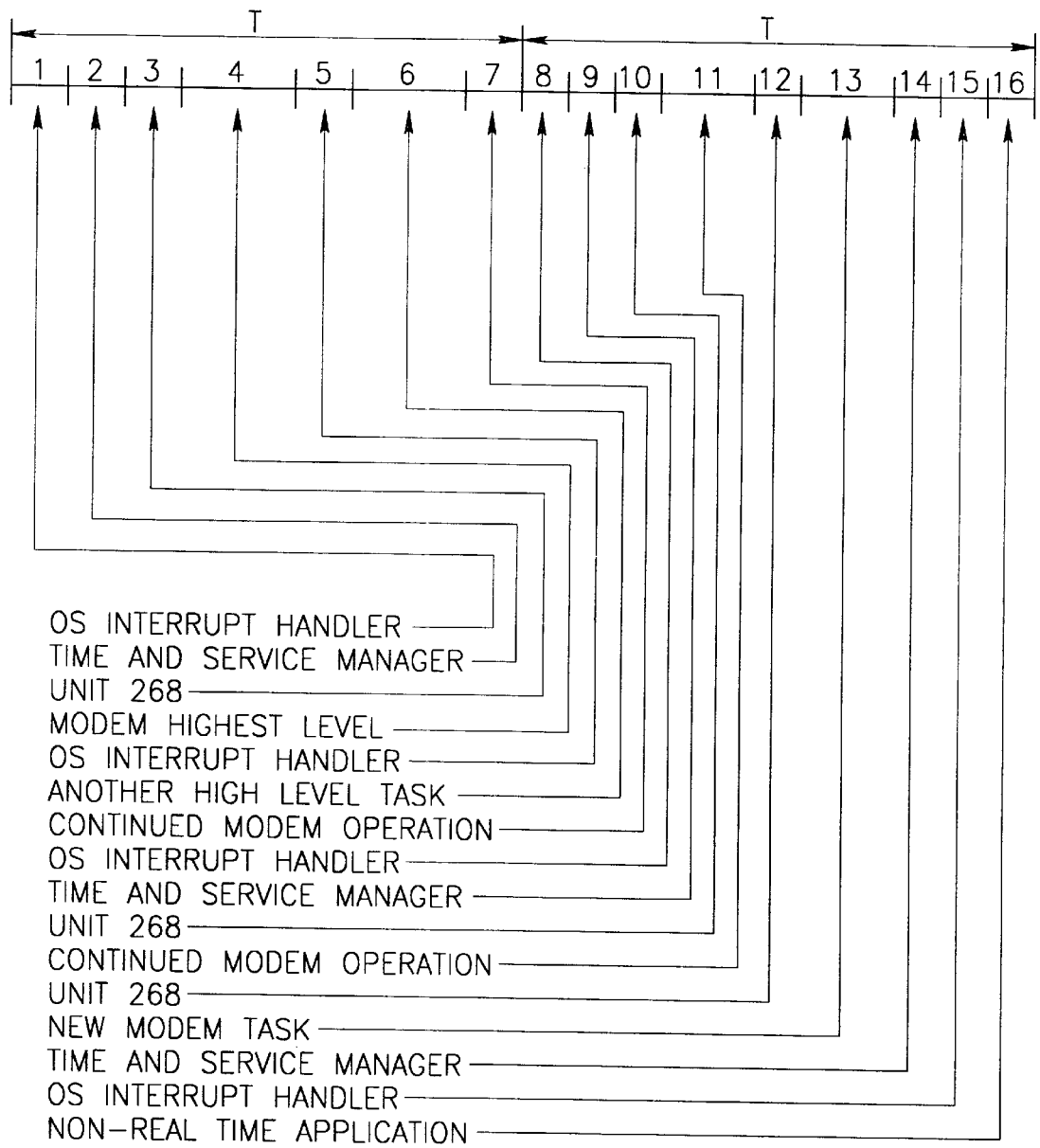
Figure 15:
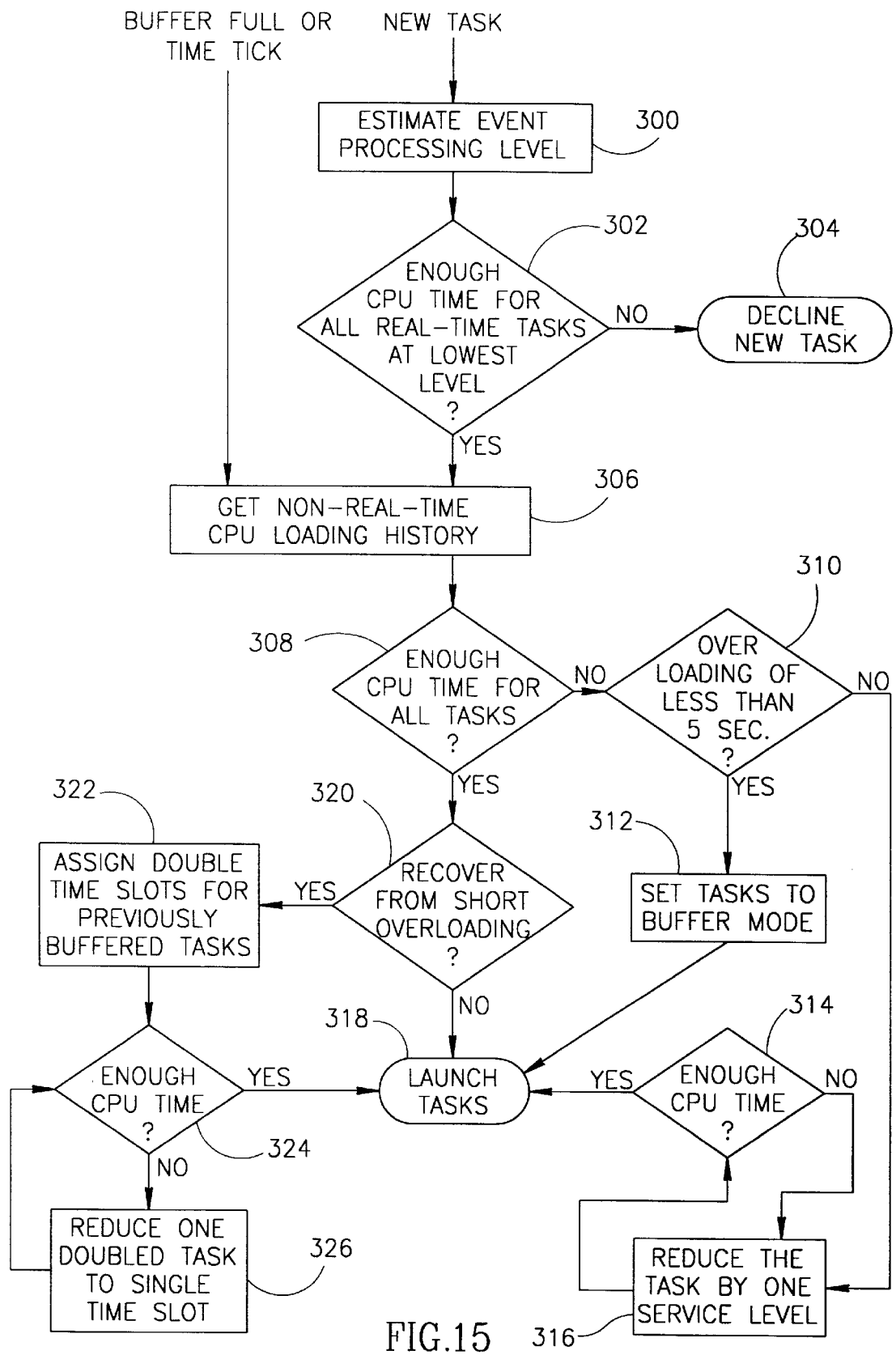
FIG. 15 is a flow chart illustration of operations of the manager of FIG. 11.

Reference is now made to FIGS. 14A, 14B, 14C and 14D which illustrate four different CPU loading situations and to FIG. 15 which illustrates the operations performed by time allocater 268 in response to the loading situations.

In FIG. 14A, the CPU 210 is not overloaded and time allocater 268 can run all real-time devices at their full service levels. The time period begins with the occurrence of an interrupt event 239, due, as described hereinabove, to the periodic operation of timer 216, to the buffer 241 being fill, to an external interrupting event, or to a real-time application 240. During time slot 1 the interrupt handler of the operating system 233 operates and, during time slot 2, the operating system provides control to the task service manager 250. During time slot 3, unit 250 determines the resource requirements for the current time period. Since the non-modem task requires relatively little operating time, unit 250 estimates the length of time each of the modem tasks will require to operate at their highest performance levels. At the beginning of time slot 4, unit 250 activates a modem application operating at the highest performance level and at the beginning of time slot 5, unit 250 activates an audio application, also at its highest performance level. Both real-time applications operate on the data stored in buffer 241. Once the buffers are empty, the applications return control to unit 250. While the non-real-time applications operate, the DMA 217 refills the emptied buffer 241.

During time slot 6, unit 250 finalizes its operations and provides control back to the operating system 233. Time slot 7 is utilized by the interrupt handler of the operating system 233 to close the operation of unit 250 and to activate any non-modem tasks. For the example shown in FIG. 14A, the task performed is one which is somewhat computationally intensive, such as a spreadsheet operation.

FIG. 14B illustrates the time allocation when the non-modem task is very computationally intensive such that the modem tasks, at full performance level, cannot be implemented in the time available. For example, the word processor may be performing a spell-check while a facsimile is being received. In this situation, both applications require the resources of the CPU 210; however, the CPU 210 cannot comply.

In FIG. 14B, time slots 1–3 and 6 and 7 remain of the same length; however, time slot 8, for the non-modem task, is much longer. Correspondingly, the time slots 5 and 6, allocated to the modem and audio tasks, are much smaller. In order for the modem and audio tasks to finish processing the data received, they both operate at lower performance levels, as described hereinabove.

Alternatively, if the performance history indicates that the overloading is expected to be short (e.g. less than two seconds), the task service manager 250 can implement a "buffered mode" in which the received data is pre-processed only and then stored in a separate, momentary, buffer implemented in main memory 212. Typically, there is one momentary buffer, of the length of two seconds of data at the current service level.

The pre-processing is necessary to ensure that no events which require an immediate response were received, and, if they were received, that the appropriate response is provided. For example, for a facsimile operation, an entire page can be buffered before the facsimile machine has to respond to the sending machine. As described in more detail hereinbelow with respect to FIGS. 14C and 15, the momentary buffer is cleared during periods of low, non-real-time activity.

FIG. 14C illustrates the time allocation when the non-modem task is not computationally intensive and/or in response to a previous momentary buffering operation. As before, time slots 1–3 and 6 and 7 remain of the same length; however, time slot 8, for the non-modem task, is much shorter. Correspondingly, the time slots 5 and 6, allocated to the modem and audio tasks, are twice as long as in FIG. 14B. Thus, during these long time slots, the modem and audio tasks can recover from having been in buffered modes.

FIG. 14D illustrates the time allocation if there is another task which interrupted the task service manager 250 and is now running at the highest CPU priority level. As a result, the task service manager 250 of the present invention does not run for as long as it anticipated, resulting in unprocessed data at the end of the time period T. The performance monitor 266 will detect this situation by the fact that a "nested" interrupt is present and the task allocater 268 will originally operate in the buffered mode. If the nested interrupt lasts for too long, the task allocater 268 will reduce the service levels of the active tasks, as necessary.

In FIG. 14D, time slots 1–3 remain the same length and invoke the applications to be processed. Time slot 4 is allocated to the modem at the highest level. However, in time slot 5, the modem activity is interrupted, by the interrupt handler of the operating system, for use with another high level task. Time slot 6, which wasn't allocated at all, is the time utilized by the other high level task. In time slot 7, the modem activity continues but does not process all of the data available to it. At the end of time slot 7, the time period T has ended.

Time slots 8–10 begin the next time period where the task allocater 268 attempts to clear out the remaining data. Thus, it allocates all of time slot 11 to modem processing. When that processing has finished, task allocater 268 operates again, in time slot 12, to determine what action to activate next. For example, it may be a new task for the modem. Time slot 13 is provided for this task. In time slot 14, time and service manager 250 finalizes its operations and provides control back to the operating system 233. Time slot 7 is utilized by the interrupt handler of the operating system 233 to close the operation of unit 250 and to activate any non-modem tasks (in time slot 16).

FIG. 15 illustrates the operations performed to determine the time slot allocation of FIGS. 14A–14D. The operations begin when control is received from the interrupt handler of the operating system.

In step 300, which is performed when a new task is invoked, time allocater 268 receives the new task(s) and a list of the currently active modem tasks from the invocation interpreter 260. Time allocater 268 then estimates how long each currently active, real-time event will take, based on the data in task table 262.

In step 302, the time allocater 268 determines if there is enough time available in a time period T to perform all of the currently active, modem tasks at their lowest performance level. If not, time allocater 268 indicates to the user (step 304) that the new task(s) cannot be serviced. If so, the new task(s) are launched.

Step 306 is performed when a new time tick or buffer full interrupt is received, once the tasks have been launched. The time allocater 268 receives a list of the currently active non-modem tasks, how active each one is and their performance history from the performance monitor 266.

In step 308, the time allocater 268 determines, from the data received from the task table 262 for the current modem tasks and from the performance monitor 266, if there is enough time available in time period T to perform all the non-real-time and modem tasks, with the modem tasks at their highest performance levels and the non-modem tasks at their normal or somewhat degraded levels. If not, time allocater 268 proceeds to step 310; otherwise, it proceeds to step 320.

In step 310, time allocater 268 determines the extent of the overloading. If the overloading is less than a predetermined amount of time, such as 5 seconds, time allocater 268 moves (step 312) all of the currently active, modem tasks to the buffering mode and launches the tasks (step 318).

If, the overloading is more than 5 seconds, the time allocater 268 reduces (step 316) the service level of each of the currently active, modem tasks. Time allocater 268 moves to step 314 to determine if, at the lower performance level, there is enough CPU time available. If so, the tasks are assigned their time slots and launched. Otherwise, either the service level is further reduced or the time allocater 268 indicates to the user that it cannot perform all desired tasks.

In step 320 (when there is enough CPU time to perform all tasks), the time allocater 268 determines if there is enough CPU time to enable the modem tasks to recover from the buffering mode. If not, the time allocater 268 proceeds to step 318, maintaining the buffering mode if it is currently active.

If there is enough CPU time available, the time allocater 268 assigns (step 322) time slots of twice the previous length for those modem tasks which were previously in the buffered mode. In step 324, the time allocater 268 determines whether, with the double length time slots, there is enough available CPU time. If so, time allocater 268 proceeds to step 318. Otherwise, time allocater 268 reduces (step 326) one of the double length time slots to a single length time slot and determines, once again (in step 324), if there is enough time available. If not, the process is repeated until there is enough time.

It will further be appreciated by persons skilled in the art that the present invention is not limited by what has been particularly shown and described herein above. Rather the scope of the invention is defined by the claims that follow:

What is claimed is:

1. A manager for a personal computer for managing the operation of modem tasks while the personal computer also performs other tasks, the manager comprising:

at least one driver for activating and controlling said modem tasks; and a task service manager for allocating time between said modem tasks and the other tasks, for selecting the service levels of said modem tasks in response to the activity levels of said other tasks, and for invoking the driver to activate and control said modem tasks at the selected service levels.

2. A manager according to claim 1 and wherein said task service manager includes:

task requirement means for determining expected task runtime requirements for the currently active modem and other tasks; and a time allocater for changing the service level of at least one of said currently active modem tasks if the activity level of at least one of said other tasks has changed significantly and for allocating time among said currently active modem and other tasks.

3. A manager according to claim 2 and wherein said task requirement means includes:
   a modem task lookup table for listing at least the length of time required for each modem task at each service level; and
   a performance monitor for dynamically monitoring the useful loading of the central processing unit (CPU) of said personal computer with respect to the activity level of all of the tasks, for determining the time available for the modem tasks from among said predefined percentages and for selecting the service level of each modem task from said modem task lookup table.

4. A manager according to claim 3 and wherein said performance monitor includes performance counters which measure the activity levels of the tasks.

5. A manager according to claim 4 and wherein said performance counters measure at least one of: the number of data writes, floating point operations, multimedia instructions and the amount of bus activity during a predetermined length of time.

6. A manager according to claim 4 and wherein said performance monitor includes means for comparing the values of said performance counters with previously determined values indicating idle activity.

7. A manager according to claim 3 wherein said performance monitor includes means for detecting a nested interrupt of said task service manager by an operating system of said personal computer and wherein said time allocater includes means for allocating more time to tasks interrupted by a nested interrupt.

8. A manager according to claim 3 wherein said performance monitor includes means for monitoring data transfer over a modem and wherein said time allocater includes means at least for reducing the service level of said modem task when there is no data transfer.

9. A manager according to claim 2 and wherein at least one of said modem tasks is a receiving modem task communicating with a sending modem, said sending modem and receiving modem task utilizing a constellation, and wherein said time allocater includes:
   constellation changing means, operative in the presence of clean communication lines, for requesting that said sending modem change said constellation.

10. A manager according to claim 9 and also comprising processing level changing means for changing the processing quality of said receiving modem task in response at least to the change of the constellation of the sending modem, in order to change the service level of the communication therebetween.

11. A manager according to claim 3 and wherein at least one of said modem tasks is a receiving modem task communicating with a sending modem, said sending modem and receiving modem task utilizing a constellation, and wherein said time allocater includes:
   processing level changing means for changing the processing quality of said receiving modem task when said performance monitor expects a CPU overloading for a short period of time in order to temporarily change the service level of the communication therebetween.

12. A manager according to claim 3 and wherein at least one of said modem tasks is a receiving modem task communicating with a sending modem, and wherein said time allocater includes momentary degradation means for momentarily not accepting data, thereby requiring said sending modem to retransmit the data.

13. A manager according to claim 1 which operates in conjunction with at least one real-time device, and additionally comprises an adjustable-sized buffer into which data received from said real-time devices during a predetermined length of time are placed to be processed later by the modem tasks associated with said at least one real-time device.

14. A manager according to claim 2 which operates in conjunction with at least one real-time device, and additionally comprises an adjustable-sized buffer into which data received from said real-time devices during a predetermined length of time are placed to be processed later by the modem tasks associated with said at least one real-time device,
   wherein said adjustable-sized buffer includes a buffer size changer for adjusting the size of said buffer when said time allocater changes the service level of a currently active task such that said adjustable-sized buffer holds data from said currently active tasks, at their current service levels, received during said predetermined length of time.

15. A manager according to claim 14 and also comprising means for invoking said task service manager which is activated at least when said adjustable-sized buffer is full.

16. A manager according to claim 3 which operates in conjunction with at least one real-time device, and additionally comprises:
   an adjustable-sized buffer into which data received from said real-time devices during a predetermined length of time are placed to be processed later by the modem tasks associated with said at least one real-time device; and
   a momentary buffer into which data from said adjustable-sized buffer are placed, after pre-processing by said task service manager. when said performance monitor expects a CPU overloading for a short period of time.

17. A manager according to claim 2 and wherein said time to be allocated is selected from among predefined percentages of time.

18. A method for managing the operation of modem tasks of a personal computer while the personal computer also performs other tasks, the method comprising:
   allocating time between said modem tasks and said other tasks; and
   selecting the service levels of said modem tasks in response to the activity levels of said other tasks.

19. A method according to claim 18 and wherein said allocating time includes:
   dynamically monitoring the useful loading of the central processing unit (CPU) of said personal computer with respect to the activity level of all of the tasks;
   determining the amount of time available for the modem tasks from among said predefined percentages; and
   selecting the service levels of the currently active modem tasks in accordance with the amount of time available.

20. A method according to claim 19 and wherein said second selecting includes comparing the values of performance counters which monitor the activity level of the CPU with previously determined values.

21. A method according to claim 18 and wherein at least one of said modem tasks is a receiving modem task communicating with a sending modem, said sending modem and receiving modem task utilizing a constellation, and wherein said first selecting includes:
   requesting that, in the presence of clean communication lines, said sending modem change said constellation.

22. A method according to claim 21 and wherein said first selecting additionally includes:

changing the processing quality of said receiving modem task in response at least to the change of the constellation of the sending modem, in order to change the service level of the communication therebetween.

23. A method according to claim 19 and wherein at least one of said modem tasks is a receiving modem task communicating with a sending modem, said sending modem and receiving modem task utilizing a constellation, and wherein said first selecting includes:

changing the processing quality of said receiving modem task when said step of monitoring indicates a CPU overloading for a short period of time in order to temporarily change the service level of the communication.

24. A method according to claim 18 and wherein at least one of said modem tasks is a receiving modem task communicating with a sending modem, and wherein said first step of selecting includes the step of momentarily not accepting data, thereby requiring said sending modem to retransmit the data.

25. A method according to claim 18 and wherein said first selecting includes adjusting the size of a buffer when the service level of a currently active task is changed such that said buffer holds data from said currently active tasks, at their current service levels, received during a predetermined length of time.

26. A method according to claim 18 and wherein said amount of time to be allocated is selected from among predefined percentages of time.

27. A method for managing the operation of modem tasks performed by a personal computer while the personal computer also performs other tasks, the method comprising:

monitoring at least one of the following:
  a) performance counters which determine the activity level of the computer;
  b) a nested interrupt by an operating system of said personal computer; and
  c) the presence or absence of data transfers,
to determine the useful loading of the central processing unit (CPU) of said personal computer with respect to the activity level of all of the tasks;

determining the amount of time available for the modem tasks from among said predefined percentages;

selecting the service levels of the currently active modem tasks in accordance with the amount of time available; and adjusting the size of a buffer into which data received from said real-time devices during a predetermined length of time are placed to be processed later by the modem tasks associated with said at least one real-time device thereby to match the size of said buffer with the amount of processing time allocated to said currently active modem tasks.

* * * * *